US012655298B2

(12) United States Patent
Crick et al.

(10) Patent No.: US 12,655,298 B2
(45) Date of Patent: Jun. 16, 2026

(54) SUPERHYDROPHOBIC SURFACES

(71) Applicant: QUEEN MARY UNIVERSITY OF LONDON, London (GB)

(72) Inventors: Colin R. Crick, Liverpool (GB); Rebekah Louise Upton, Liverpool (GB)

(73) Assignee: QUEEN MARY UNIVERSITY OF LONDON, Liverpool (GB)

( * ) Notice: Subject to any disclaimer, the term of this patent is extended or adjusted under 35 U.S.C. 154(b) by 218 days.

(21) Appl. No.: 17/438,169

(22) PCT Filed: Mar. 10, 2020

(86) PCT No.: PCT/GB2020/050571
§ 371 (c)(1),
(2) Date: Sep. 10, 2021

(87) PCT Pub. No.: WO2020/183149
PCT Pub. Date: Sep. 17, 2020

(65) Prior Publication Data
US 2022/0145084 A1 May 12, 2022

(30) Foreign Application Priority Data
Mar. 12, 2019 (GB) ...................................... 1903387

(51) Int. Cl.
*C09C 1/30* (2006.01)
*B05D 3/12* (2006.01)
(Continued)

(52) U.S. Cl.
CPC .............. *C09C 1/3072* (2013.01); *B05D 3/12* (2013.01); *B05D 5/08* (2013.01); *C09C 1/3081* (2013.01);
(Continued)

(58) Field of Classification Search
CPC ..... C09C 1/3072; C09C 1/3081; C09D 5/031; C09D 5/1681; C09D 5/00; C09D 123/06; C09D 123/12
See application file for complete search history.

(56) References Cited

U.S. PATENT DOCUMENTS 3,852,194 A * 12/1974 Zine, Jr. ............... G01N 33/491 494/81
5,905,833 A * 5/1999 Sheu .................... G02B 6/4494 385/100
(Continued)

FOREIGN PATENT DOCUMENTS

CN 101962514 A 2/2011
CN 105315801 A 2/2016
(Continued)

OTHER PUBLICATIONS

Han et al., "Fabrication of recyclable superhydrophobic cotton fabrics," Appl. Surface Sci. 400, 405-412 (Year: 2017).*
(Continued)

*Primary Examiner* — Kregg T Brooks
(74) *Attorney, Agent, or Firm* — Hoffman Warnick LLC

(57) ABSTRACT

A superhydrophobic film for coating a substrate. The superhydrophobic film comprises a plurality of nanoparticles joined together to form a continuous film, each nanoparticle having a polymer coating, wherein the ratio of average particle size of the nanoparticles to the average thickness of their polymer coatings is from 2.5:1 to 20:1. The superhydrophobic film suitably provides a durable, UV resistant coating which maintains a high water contact angle during use. A method of preparing a superhydrophobic film on a substrate is also disclosed, the method comprising admixing nanoparticles and a polymer to form nanoparticles having a polymer coating and applying the nanoparticles having a polymer coating to the substrate to form the superhydro-
(Continued)

Figure 1:
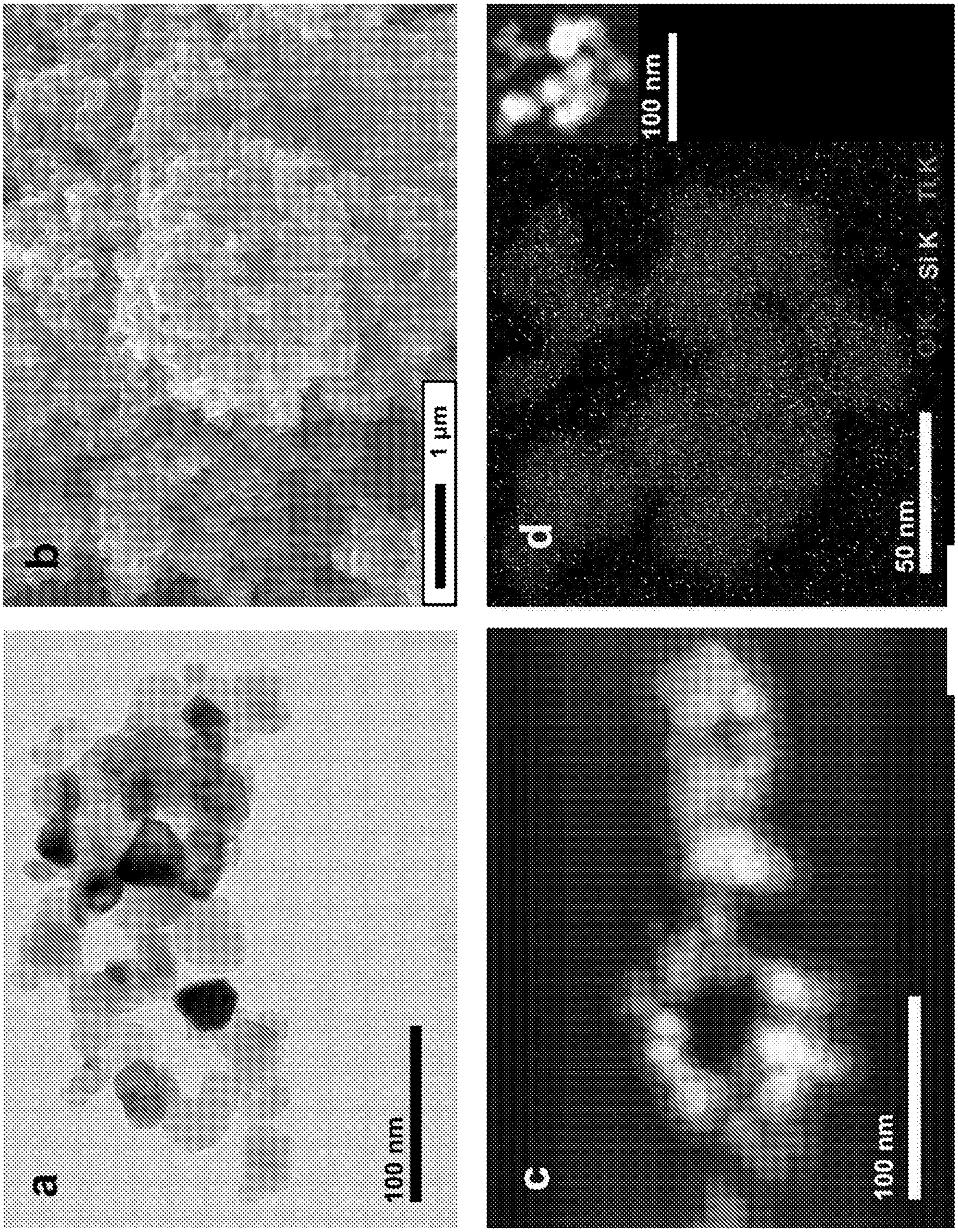

phobic film. A formulation for coating an article with such a superhydrophobic film is also disclosed.

14 Claims, 26 Drawing Sheets

(51) Int. Cl.
*B05D 5/08* (2006.01)
*C09D 5/16* (2006.01)
*C09D 127/06* (2006.01)

(52) U.S. Cl.
CPC ......... *C09D 5/1681* (2013.01); *C09D 127/06* (2013.01); *C01P 2004/62* (2013.01); *C01P 2004/64* (2013.01)

(56) References Cited

U.S. PATENT DOCUMENTS

| | | | | |
|---|---|---|---|---|
| 2006/0266258 | A1* | 11/2006 | Asakura | C09D 7/67 106/2 |
| 2007/0009657 | A1 | 1/2007 | Zhang et al. | |
| 2010/0152147 | A1* | 6/2010 | Fuge | A61K 9/0043 514/217.05 |
| 2015/0247079 | A1* | 9/2015 | Nishikawa | C09C 1/28 428/327 |
| 2015/0314554 | A1 | 11/2015 | Fujiwara et al. | |
| 2017/0260615 | A1 | 9/2017 | Venema et al. | |
| 2018/0148599 | A1 | 5/2018 | Bandyopadhyay et al. | |

FOREIGN PATENT DOCUMENTS

| | | | |
|---|---|---|---|
| CN | 109054627 | A | 12/2018 |
| CN | 109486354 | A | 3/2019 |
| CN | 109535932 | A | 3/2019 |
| WO | 2016138272 | A1 | 9/2016 |
| WO | 2016138277 | A1 | 9/2016 |

OTHER PUBLICATIONS

Park et al., "Preparation of self-cleaning surfaces with a dual functionality of superhydrophobicity and photocatalytic activity," Appl. Surface Sci. 319, 367-371 (Year: 2014).*
Jeong et al., "Quenching of photocatalytic activity and enhancement of photostability of ZnO particles by polydimethylsiloxane coating," J. Mat. Sci. 47(13), 5190-5196 (Year: 2012).*
Scientific Polymer Products, Density of Polymers by Density, at http://scientificpolymer.com/density-of-polymers-by-density (Year: 2018).*
Chinese Office Action for Application No. 202080027791.0, dated May 7, 2022, 25 pages.
PCT International Search Report and Written Opinion for International Application No. PCT/GB2020/050571, dated May 28, 2020, 16 pages.
Great Britain Search Report for Application No. GB1903387.7, dated Aug. 27, 2019, 3 pages.
Hua Zhou et al., "Fluoroalkyl Silane Modified Silicone Rubber/Nanoparticle Composite: A Super Durable, Robust Superhydrophobic Fabric Coating," Advanced Materials, 2012, 24, pp. 2409-2412.
Yang et al., "The solvent-induced cracking in glassy polymer coatings by atomic force microscopy," Materials Chemistry and Physics 42: 220-224 (1995).
Tomar et al., "Cracking in drying films of polymer solutions," Soft Matter 16: 3476-3484 (2020).
Yamamura et al., "Multiple crack nucleation in drying nanoparticle-polymer coatings," Colloids and Surfaces A: Physiochemical and Engineering Aspects 342: 65-69 (2009).

* cited by examiner

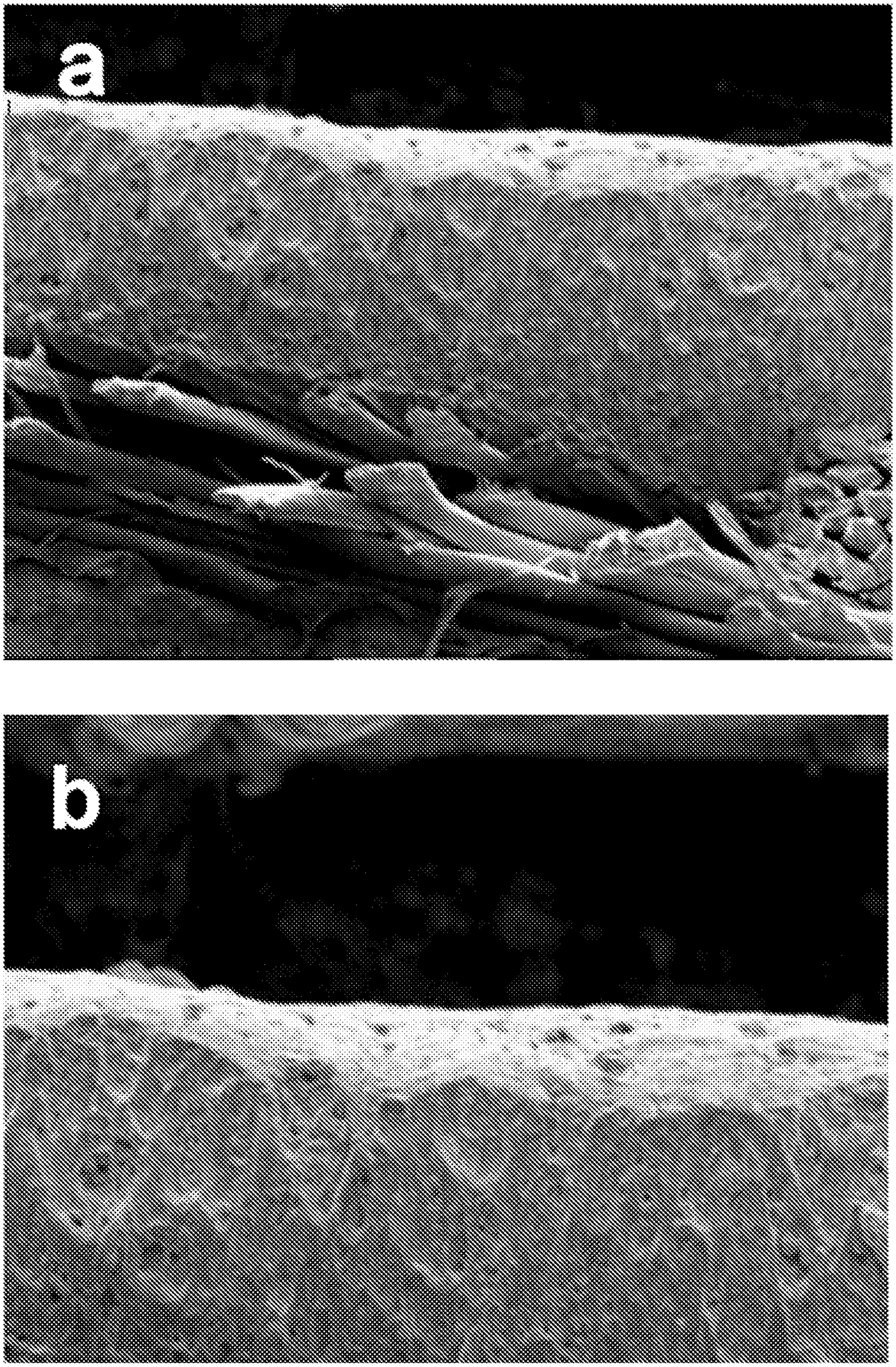
Fig. 10a and b

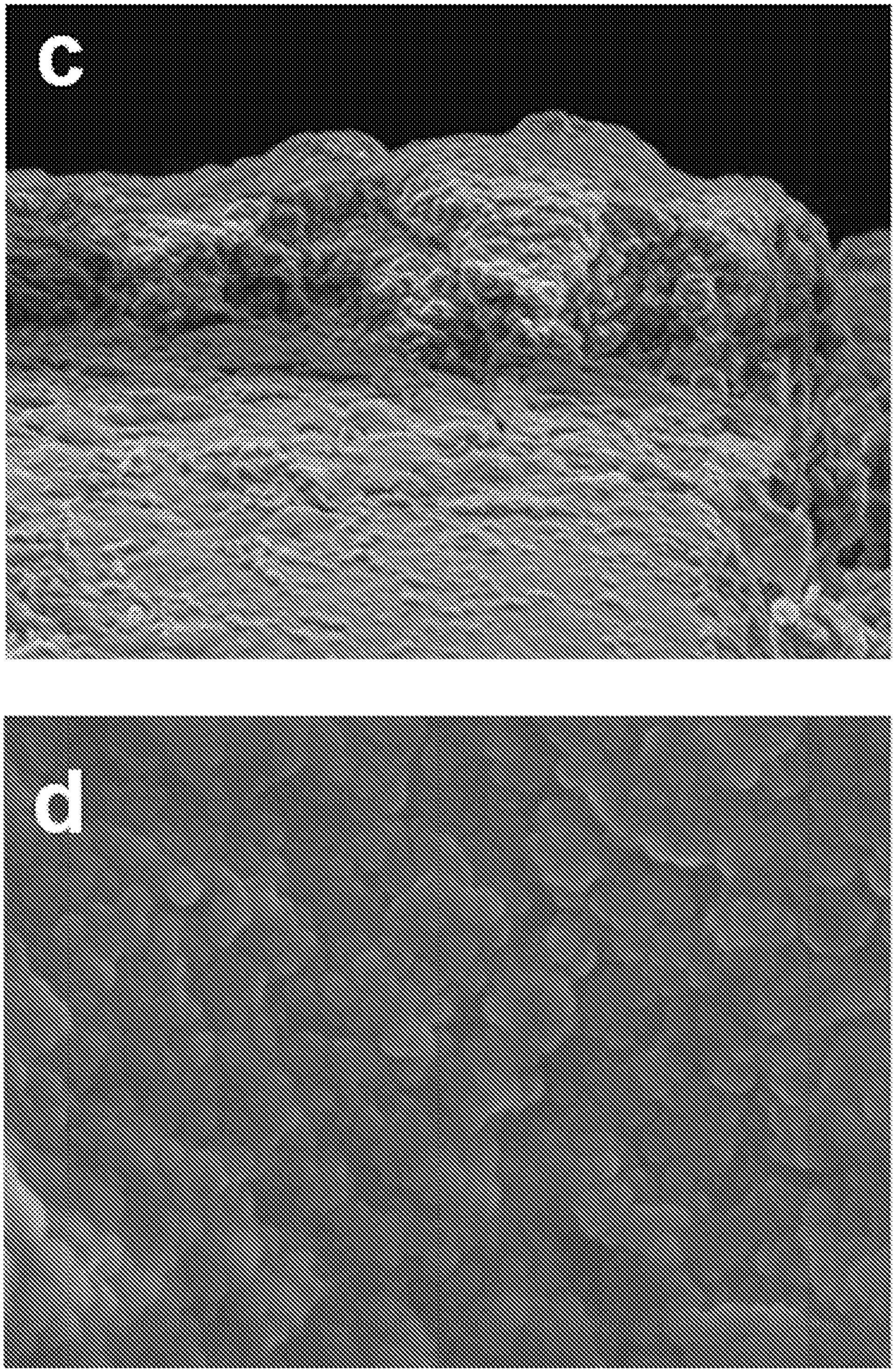
Fig. 10c and d

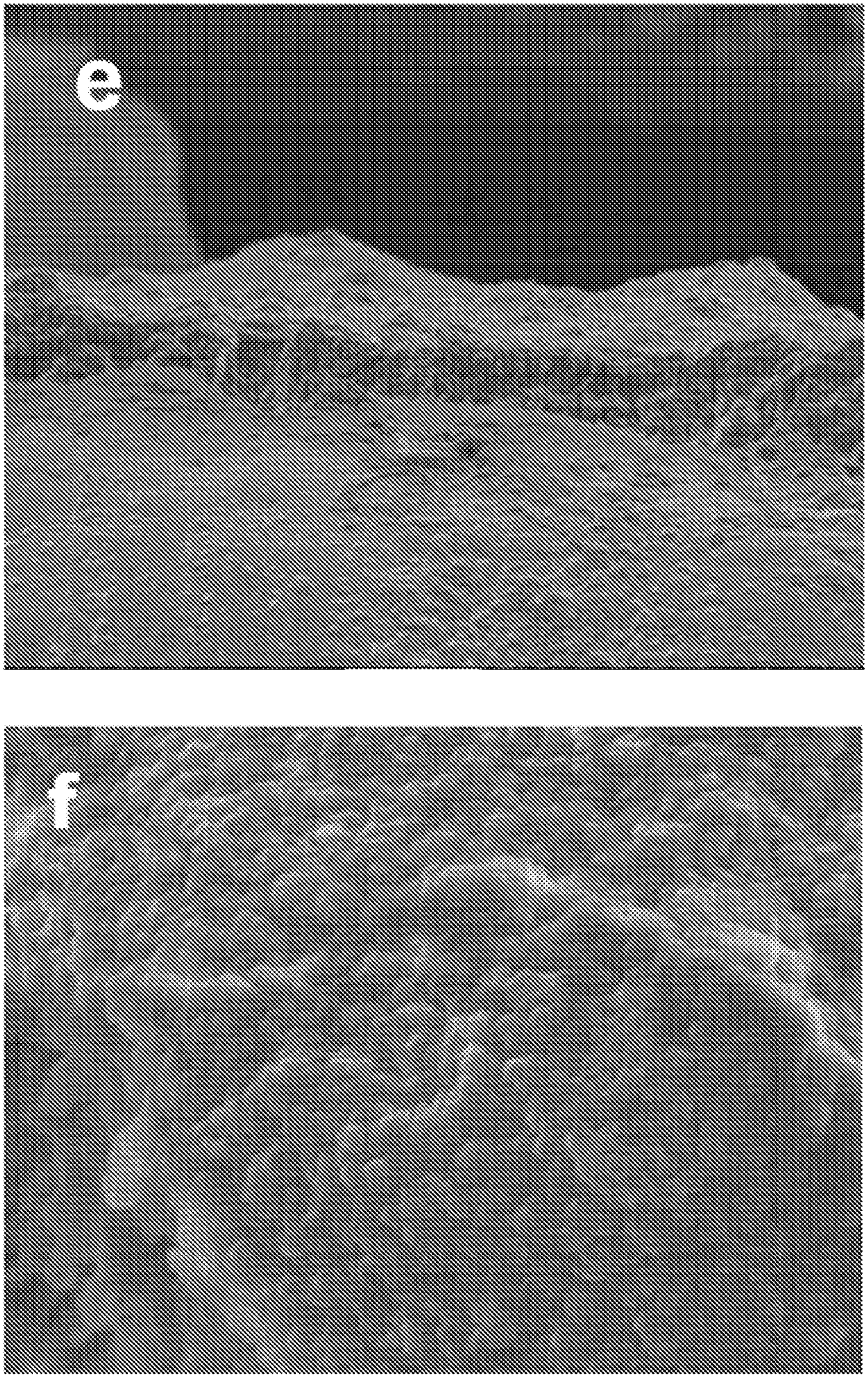
Fig. 10e and f

SUPERHYDROPHOBIC SURFACES

FIELD

The present invention relates to a superhydrophobic composition, for example a film, an article comprising such a superhydrophobic film, a method of producing such a superhydrophobic film and to a formulation for coating an article with such a superhydrophobic film. In particular the invention relates to a superhydrophobic film comprising nanoparticles which have a polymer coating.

BACKGROUND

Self-cleaning technology has huge commercial potential and can be implemented in a wide range of areas, for example in anti-fouling paints, window glass, concrete, and textiles, amongst others. At present, self-cleaning functionality can be achieved using two main surface types: superhydrophobic or superhydrophilic. Both surface types allow for the removal of surface bound contaminates such as dirt and bacteria.

Self-cleaning superhydrophilic surfaces make use of a synergetic effect of light-induced photocatalysis and hydrophilicity. In this mechanism, the surface-bound organic matter is degraded and subsequently removed by the action of water spreading homogeneously across the surface in a phenomenon known as water sheeting. Coatings designed from inherently hydrophilic, photo-active materials may become superhydrophilic when irradiated with UV light due to photo-induced oxygen vacancies. However, superhydrophilic self-cleaning is often considered to be inferior to the superhydrophobic equivalent, as high water repellency and reduced biofilm formation provides a more effective cleaning system.

Superhydrophobic surfaces are made by combining surface roughening with low surface-energy materials. A high water contact angle (WCA), defined as being greater than 150°, and low contact angle hysteresis (CAH) are characteristic features used to quantify hydrophobicity. Water on such superhydrophobic surfaces forms almost spherical droplets which minimises surface tension, and such droplets roll off the surface, taking unwanted dirt particulates and surface bacteria with them, in a phenomenon that is known as the Lotus effect.

SUMMARY OF THE INVENTION

Superhydrophobic surfaces can be inexpensively engineered from inorganic nanoparticles treated with an organic coating. Selection of the appropriate nanoparticle-organic composite is critical for the durability and visual properties of a coating. Regarding visual properties, titania ($TiO_2$) is a wide band gap semi-conductor oxide that is essential for pigmented coatings due to its high refractive index and known optical properties, the combination of which enables maximum scattering of visible light in $TiO_2$ nanomaterials. These factors make titania the brightest white pigment in common use, and is crucial to paint and coatings industries.

Known methods of forming superhydrophobic coatings using photo-active nanoparticles (such as $TiO_2$) in combination with low surface-energy materials may limit the usefulness of the resultant superhydrophobic surface as such known coatings have been shown to lose superhydrophobicity relatively quickly, for example after a few hours of exposure to UV light. Such superhydrophobic coatings are also reported to have weak mechanical durability which would further limit the industrial usefulness of these coatings.

Furthermore, successful fabrication methods typically involve the use of fluorinated chemicals, multi-step modification processes, or the requirement for specialised equipment, all of which can be expensive and/or environmentally hazardous.

It is one aim of the present invention, amongst others, to provide a superhydrophobic film that addresses at least one disadvantage of the prior art, whether identified here or elsewhere, or to provide an alternative to existing superhydrophobic films. For instance it may be an aim of the present invention to provide a superhydrophobic film with improved UV resistance and improved mechanical stability.

It is also an aim of the present invention to provide a method of forming such a superhydrophobic film on a substrate which may be more efficient and cost effective than known methods.

According to aspects of the present invention, there is provided a superhydrophobic film, article, method and formulation as set forth in the appended claims. Other features of the invention will be apparent from the dependent claims, and the description which follows.

According to a first aspect of the present invention, there is provided a superhydrophobic film comprising an agglomeration of nanoparticles having a polymer coating, wherein the nanoparticles have a ratio of average particle size to average thickness of their polymer coatings of from 2.5:1 to 20:1.

The superhydrophobic film suitably has a high water contact angle (WCA), such as at least 150°, which means that the film is not readily wetted by water contacting the film, suitably not at all wetted by water contacting the film. The superhydrophobic film may be considered to be a superhydrophobic composition comprising the nanoparticles having a polymer coating, suitably a relatively thin composition, for example having a thickness of from 2 nm to 150 μm. The superhydrophobic film may also be considered to be a superhydrophobic coating. The film is suitably arranged on a substrate and is a relatively thin coating on said substrate, compared with the thickness of said substrate. Suitable substrates are glass, metals, masonry and fabric. The superhydrophobic film has at least one surface which displays these superhydrophobic properties, suitably a surface which is exposed to the atmosphere in use, suitably an upper surface in relation to said substrate. The superhydrophobic film suitably comprises a surface which is not exposed to the atmosphere in use, and which is suitably bound to said substrate.

The superhydrophobic film comprises nanoparticles having a polymer coating. The nanoparticles having a polymer coating may be alternatively or additionally defined as polymer coated nanoparticles. Suitably each of the nanoparticles is provided with a polymer layer which entirely coats the nanoparticle. The average thickness of the coatings on the nanoparticles depends on the average particle size of the nanoparticles, with the nanoparticles having a ratio of average particle size to average thickness of their polymer coatings of from 2.5:1 to 20:1, suitably from 2.5:1 to 15:1, suitably from 2.5:1 to 10:1, suitably from 2.5:1 to 6:1, suitably 3:1 to 5:1. Therefore smaller nanoparticles suitably have a polymer coating with a lower thickness than the polymer coating on larger nanoparticles. The inventors have found that larger nanoparticles can have thicker polymer coatings whilst maintaining the superhydrophobic properties of the film, than would be possible with smaller nanoparticles. The average thickness of the polymer coatings is suitably from 0.5 to 150 nm, depending on the average particle size of the nanoparticles. For example, when the nanoparticles have an average particle size of from 5 to 50 nm, the average thickness of the polymer coatings on the nanoparticles is suitably from 0.5 to 25 nm, suitably from 0.5 to 10 nm, with the stated ratio of average particle size to average thickness of their polymer coatings of from 2.5:1 to 20:1. When the nanoparticles have an average particle size of from 250 to 500 nm, the average thickness of the polymer coatings on the nanoparticles is suitably from 25 to 150 nm. The actual thickness of the polymer coating on any one particular nanoparticle may vary, suitably within the stated range.

The superhydrophobic film comprises an agglomeration of these nanoparticles having polymer coatings. Therefore the superhydrophobic film may be considered to comprise a plurality of the polymer coated nanoparticles which are arranged together to form a continuous mass which constitutes the superhydrophobic film. Suitably the superhydrophobic film is continuous and does not expose to the atmosphere any of a surface of an underlying substrate in the region of said substrate coated by the film. Suitably the agglomeration of polymer coated nanoparticles is provided by the plurality of polymer coated nanoparticles contacting and binding to each other through their polymer coatings. Therefore the agglomeration may be considered to be formed through the bonding of polymer coatings of adjacent nanoparticles. Suitably the polymer coatings on the nanoparticles are of the same polymer, allowing the polymer coatings of adjacent nanoparticles in the film to partially intermix (under suitable formation conditions) to provide the bonding and produce the superhydrophobic film.

This agglomeration of nanoparticles suitably provides the film with a surface of a highly rough, hierarchical surface morphology, which provides the superhydrophobicity.

The inventors have found that superhydrophobic films according to this first aspect can provide a surface with a high WCA, for example above 160°, which may be maintained during exposure to UV light over a significant period of time, for example at least 24 hours or suitably at least 4 days. The superhydrophobic films may also provide a coating having good mechanical resistance to repeated abrasion and may therefore be suitable for industrial applications which involve coating surfaces which are abraded during use.

Suitably the superhydrophobic film has a WCA of at least 150°, suitably greater than 150°. Suitably the superhydrophobic film has a WCA of at least 155°, for example at least 160° or at least 165°. Suitably the superhydrophobic film has a WCA of from 150 to 180°, for example of from 155 to 175°.

Suitably the nanoparticles of the superhydrophobic film are metal oxide nanoparticles. Suitable metal oxide nanoparticles may be selected from $SiO_2$, $TiO_2$, $CeO_2$, CaO, MgO, $ZnO_2$, $Al_2O_3$, BaO or mixtures thereof. Suitably the metal oxide nanoparticles are selected from $SiO_2$, $TiO_2$, $CeO_2$ or mixtures thereof.

In some embodiments, the nanoparticles are $SiO_2$ nanoparticles, suitably pre-functionalised $SiO_2$ nanoparticles. Pre-functionalisation of the nanoparticles may be carried out by treating the $SiO_2$ nanoparticles with an agent which modifies the functional groups on the surface of the $SiO_2$ nanoparticles, before coating with the polymer, for example to improve the binding of the polymer to the nanoparticle. Suitably $SiO_2$ nanoparticles are pre-functionalised with hexamethyldisilazane (HMDS).

In some embodiments, the nanoparticles are provided by a mixture of $SiO_2$ or $TiO_2$ with $CeO_2$. Suitably the nanoparticles are provided by a mixture of $TiO_2$ and $CeO_2$. $CeO_2$ exhibits limited interaction with water, possibly as a result of the shielding effect of its unfilled 4*f* orbital, in addition to showing rapid recombination of charge carriers owing to a high concentration of oxygen defects acting as recombination centres. As a result, using $CeO_2$ in combination with another metal oxide nanoparticle may provide the superhydrophobic film with improved resistance to UV degradation. This may be particularly beneficial when used with $TiO_2$ nanoparticles which may be particularly liable to degrade the polymer coating on exposure to UV light and therefore adversely affect the superhydrophobicity of the film.

In such embodiments, the nanoparticles may comprise a mixture of $SiO_2$ or $TiO_2$ with $CeO_2$ in a ratio of $SiO_2$ or $TiO_2$:$CeO_2$ of from 1:50 to 1:1, suitably from 1:20 to 1:5, for example approximately 1:10. The inventors have found that a ratio of 1:10 $TiO_2$:$CeO_2$ nanoparticles may provide a superhydrophobic film with a particularly good resilience to UV irradiation.

Suitably the nanoparticles of the superhydrophobic film according to this first aspect have an average particle size of from 5 to 1,000 nm, suitably of from 5 to 500 nm, suitably 5 to 100 nm, suitably from 5 to 75 nm, suitably from 10 to 75 nm, suitably from 10 to 50 nm. In some embodiments, the nanoparticles have an average particle size of from 5 to 50 nm. Suitably the average particle sizes of the nanoparticles measured from electron microscopy (TEM) approx. 50 particles in per image of $TiO_2$ and $CeO_2$. The particle sizes referred to above are of the nanoparticles before the polymer coating is applied and therefore do not include the increase in particle size caused by coating with the polymer.

The average thickness of the polymer coating on the nanoparticles is suitably from 0.5 to 125 nm, suitably from 0.5 to 50 nm, suitably from 0.5 to 20 nm.

In some embodiments, the average particle size of the nanoparticles is from 5 to 100 nm, suitably from 5 to 50 nm, and the average thickness of the polymer coating on the nanoparticles is from 0.5 to 25 nm, suitably from 0.5 to 10 nm.

In some embodiments, the average particle size of the nanoparticles is from 100 to 500 nm, suitably from 250 to 500 nm, and the average thickness of the polymer coating on the nanoparticles is from 25 to 150 nm, suitably from 50 to 100 nm.

In order to obtain the desired thickness of polymer coating on the nanoparticles, the amount of polymer used must be varied according to the particle size of the nanoparticles, to take into account that a lower volume of polymer compared to the volume of the nanoparticles is required to coat nanoparticles with a larger particle size than is required to coat nanoparticles having a smaller particle size with the same thickness of polymer coating. Suitably the ratio of the volume of the polymer coating to the volume of the nanoparticles is from 10:1 to 1:10, suitably from 3:1 to 1:5, suitably from 1:1 to 1:3.

Suitably the superhydrophobic film of this first aspect comprises an agglomeration of nanoparticles having a polymer coating, wherein the polymer coatings of the nanoparticles have an average thickness of from 0.5 to 10 nm and wherein the nanoparticles have an average particle size of from 5 to 100 nm. The inventors have found that this combination of particle size and polymer coating thickness is particularly advantageous in providing a superhydrophobic surface on the film having a high WCA.

The polymer coatings of the nanoparticles have an average thickness of from 0.5 to 10 nm. Suitably the polymer coatings of the nanoparticles have an average thickness of from 0.5 to 7 nm, suitably from 0.5 to 5 nm, suitably from 1 to 3 nm. The inventors have found that these ranges of thickness of polymer coating on the nanoparticles provides the highest WCA values, UV resistance and mechanical durability. When the thickness of the polymer coating is increased beyond these limits the WCA of the film reduces, possibly due to the relatively thick polymer coating reducing the roughness of the film surface.

The polymer which provides the polymer coating of the nanoparticles may be any suitable polymeric material which is compatible with the particular nanoparticles and with a solvent system used to form the polymer coated nanoparticles. The polymer suitably comprises at least 10 monomer repeat units, suitably at least 20 or at least 30. The polymer suitably has a weight average molecular weight of at least 500, suitably at least 750, suitably at least 1,000.

Suitably the polymer which provides the polymer coating of the nanoparticles is selected from a siloxane based polymer, a polyolefin, a polyvinylchloride or mixtures thereof.

Suitably the polymer which provides the polymer coating of the nanoparticles is selected from polydimethylsiloxane, polyethylene, polypropylene, polyvinylchloride or mixtures thereof.

In some embodiments, the polymer coating is a siloxane based polymer. Suitably the polymer coating is a polydimethylsiloxane. Polydimethylsiloxane (PDMS) is also known as dimethylpolysiloxane or dimethicone and has the structure (1):

(1)

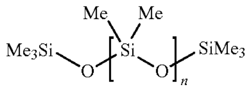

wherein n is an integer.

In embodiments wherein the polymer of the polymer coating of the nanoparticles is polyvinylchloride, the polyvinylchloride is suitably a high molecular weight polyvinylchloride.

In embodiments wherein the polymer of the polymer coating of the nanoparticles is polyethylene, the polyethylene is suitably a high density polyethylene.

In embodiments wherein the polymer of the polymer coating of the nanoparticles is polypropylene, the polypropylene suitably has a molecular weight of from 300,000 to 350,000.

The superhydrophobic film of this first aspect suitably has a thickness of from 50 nm to 100 μm, suitably from 200 nm to 50 μm.

In some embodiments, the superhydrophobic film consists essentially of the nanoparticles and the polymer coating.

In some embodiments, the superhydrophobic film consists of the nanoparticles and the polymer coating.

According to a second aspect of the present invention, there is provided an article comprising a superhydrophobic film according to the first aspect. Suitably the superhydrophobic film is bound to at least a part of the article, to provide a superhydrophobic film thereon.

The superhydrophobic film may have any of the suitable features and advantages described above in relation to the first aspect.

Suitably the at least a part of the article onto which the superhydrophobic film is formed is a glass, fabric, polymeric or metal material. Suitably the article comprising the superhydrophobic film is predominantly formed of at least one of these materials. The article may be a vehicle component, for example an interior component of a vehicle; a fabric, for example waterproof clothing; a laminated surface, for example a worktop; a furniture item; a glass sheet or pane; or any other article which would benefit from resistance to water or soiling which the superhydrophobic films of the present invention can provide.

According to a third aspect of the present invention, there is provided a method of preparing a superhydrophobic film on a substrate, the method comprising the steps of:

a) admixing nanoparticles and a polymer to form nanoparticles having a polymer coating;
b) applying the nanoparticles having a polymer coating to the substrate to form the superhydrophobic film.

The nanoparticles, polymer and polymer coating may have any of the suitable features and advantages described above in relation to the first aspect. Suitably the method of this third aspect is a method of preparing a superhydrophobic film according to a first aspect, on a substrate.

Suitably the steps of the method are carried out in the order step a) followed by step b).

Suitably the nanoparticles and polymer are mixed in step a) in a ratio which provides a sufficient amount of polymer to form the desired thickness of polymer coating on the nanoparticles, as described in relation to the first aspect. In some embodiments, the average thickness of the polymer coating on the nanoparticles is 0.5 to 10 nm, suitably a 0.5 to 5 nm thick polymer coating. Suitably step a) involves admixing nanoparticles and a polymer to form nanoparticles having a polymer coating, wherein the nanoparticles have a ratio of average particle size to average thickness of their polymer coatings of from 2.5:1 to 20:1.

As discussed above, for larger nanoparticles the relative volume of polymer required to coat the nanoparticles to a certain thickness will be lower than the volume of polymer required to coat smaller nanoparticles to the same thickness. The required amount of polymer can be calculated by considering the average volume of the nanoparticles and the volume of polymer coating around the nanoparticles which would provide the required polymer coating thickness. For example, a nanoparticle having a particle size (diameter, assuming a spherical shape) of 20 nm with a 2.5 nm polymer coating would have a nanoparticle volume of 4,189 $nm^3$ and a volume of polymer coating of 3,992 $nm^3$. Therefore a volume ratio of polymer to nanoparticle of 0.95:1 would provide the desired polymer coating thickness of 2.5 nm.

Suitably the ratio of the volume of the polymer coating to the volume of the nanoparticles is from 10:1 to 1:10, suitably from 3:1 to 1:5, suitably from 1:1 to 1:3.

Step a) involves allowing sufficient time for the polymer to coat the nanoparticles and form the polymer coated nanoparticles. For example, step a) may involve mixing the nanoparticles and polymer, for example in a solvent, for at least 10 minutes, suitably for at least 30 minutes, suitably for at least 1 hour.

Steps a) and b) may be repeated at least once, suitably repeated more than once, in order to provide a thicker superhydrophobic film on the substrate. Steps a) and b) may be repeated a sufficient number of times to provide complete coverage of a region of the substrate and to provide a superhydrophobic film with the required mechanical durability.

In some embodiments, step a) involves admixing the nanoparticles and the polymer in a solvent, and step b) involves applying the nanoparticles having a polymer coating in the solvent to the substrate. In such embodiments, the method of preparing a superhydrophobic film may be a spray coating method or a dip coating method. In such embodiments, the method suitably involves a step c) of drying the applied nanoparticles having a polymer coating to form the superhydrophobic film.

In such embodiments, the solvent may be a mixture of solvents. The solvent or solvent mixture may be chosen for compatibility with the particular nanoparticle and polymer used. The nanoparticles may be dissolved/suspended in a first solvent to form a first solution/suspension and the polymer may be dissolved/suspended in a second solvent to form a second solution/suspension, the first and second solvents being the same or different. The first and second solutions/suspensions may then be combined in step a) to provide the admixture of nanoparticles and polymer and form the nanoparticles having a polymer coating. For example an alcohol solvent, for example ethanol, may be used to dissolve/suspend $TiO_2$, $SiO_2$ or $CeO_2$ nanoparticles and an alkane solvent, such as hexane, may be used to dissolve a PDMS polymer, and then the two solutions/suspensions may be combined in step a) to form nanoparticles having a PDMS polymer coating. For other combinations of nanoparticle and polymer, different solvents may have better compatibility. For example, polyolefin polymers may be used with xylene or toluene solvent and PVC polymers may be used with tetrahydrofuran (THF), methylisobutylketone (MIBK), toluene or mixtures of MIBK and toluene.

The concentration, with respect to the nanoparticles, of the solution/suspension of polymer coated nanoparticles formed with the solvent or solvents in step a) may be from 0.01 to 1 M, suitably from 0.05 to 0.5 M, suitably from 0.05 to 0.3 M.

In some embodiments, the solution/suspension of polymer coated nanoparticles formed in step a) may then be spray coated onto a substrate, in step b), using a suitable spray coating apparatus which may be known in the art. The solution/suspension of polymer coated nanoparticles may then be dried to form the superhydrophobic film, for example in air or with the application of heat to the substrate.

The substrate may be pre-treated with a layer of a polymer, suitably the same polymer which is used in step a) to coat the nanoparticles. For example, in step b), the substrate may be spray coated with a solution of the polymer, then part dried or cured and then spray coated with the solution/suspension of polymer coated nanoparticles. This pre-treatment of the substrate may improve the mechanical durability of the superhydrophobic film on said substrate and/or improve the effectiveness of the spray coating method.

In some embodiments, the spray coating of step b) may be repeated to build up a thicker superhydrophobic film and/or to improve the mechanical durability of the superhydrophobic film. The spray coating of step b) may be repeated at least 2 times, suitably at least 4 times. Suitably the dip coating is repeated up to 11 times, suitably up to 9 times. Suitably the spray coating is repeated from 3 to 9 times, suitably 4 to 8 times, suitably 5 to 7 times or 7 times.

In some embodiments, the solution/suspension of polymer coated nanoparticles formed in step a) may be dip coated onto a substrate, in step b), using a suitable dip coating apparatus which may be known in the art. The solution/suspension of polymer coated nanoparticles may then be dried to form the superhydrophobic film, for example in air or with the application of heat to the substrate.

Suitably dip coating involves dipping the substrate on which the superhydrophobic film is to be formed into the solution/suspension of polymer coated nanoparticles formed in step a) for a set period of time then withdrawing the substrate from the solution/suspension of polymer coated nanoparticles, followed by drying the substrate. The substrate may be dipped into the solution/suspension of polymer coated nanoparticles by using an emersion rate of from 1,250 to 1,750 mm/min, for example approximately 1,530 mm/min; an emersion time of from 5 to 20 seconds, for example approximately 10 seconds; and a withdrawing rate of from 500 to 750 mm/min, for example approximately 760 mm/min. The process may be repeated a number of times sufficient to provide a suitable thickness of superhydrophobic film for a particular application. The number of repetitions required may depend on the concentration of the polymer coated nanoparticles in the suspension/solution, the temperature of the suspension/solution, the nature of the substrate and the particular combination of nanoparticles and polymer used.

Suitably the dip coating is performed at least 2 times, suitably at least 4 times. Suitably the dip coating is repeated up to 11 times, suitably up to 9 times. Suitably the dip coating is repeated from 3 to 9 times, suitably 4 to 8 times, suitably 5 to 7 times or 7 times.

The concentration of the solution/suspension of polymer coated nanoparticles used for dip coating is suitably from The solution/suspension of polymer coated nanoparticles used for dip coating may be heated to above room temperature in order to carry out the dip coating. The temperature of the solution/suspension of polymer coated nanoparticles used for dip coating is suitably from 75 to 100° C., suitably from 80 to 90° C., suitably from 85 to 87° C., particularly when a polyolefin polymer is used as the polymer coating, for example polyethylene.

The dip coating method may advantageously provide a complete coverage of the substrate and a more controllable process (for example with respect to thickness of superhydrophobic film) than other application methods.

In some embodiments of the method of this third aspect, step a) is followed by a step a2) of forming a powder of the nanoparticles having a polymer coating, and step b) involves hot pressing the powder of the nanoparticles having a polymer coating onto the substrate. Suitable hot pressing apparatus for use in this method are known in the art.

In such embodiments, step a) suitably involves admixing the nanoparticles and the polymer in a solvent and step a2) involves removing the solvent, for example by evaporation to provide a solid of the polymer coated nanoparticles. Suitably step a2) involves grinding the solid polymer coated nanoparticles obtained from removing the solvent to provide the powder of the polymer coated nanoparticles.

In embodiments wherein the polymer is PVC, the solvent may be THF, MIBK or butyl acetate.

In the embodiments of the method involving hot pressing, step b) suitably involves arranging the powder of the nanoparticles having a polymer coating onto the substrate, arranging the substrate and powder in a suitable hot pressing apparatus and then applying heat and pressure to the substrate and powder to form the superhydrophobic film on the substrate.

The temperature at which the hot pressing of step b) is carried out is suitably from 150 to 200° C., suitably from 160 to 190° C., suitably from 170 to 190° C., for example approximately 180° C. Suitably said hot pressing apparatus comprises an upper plate and a bottom plate which are brought together to provide the required pressing. The aforementioned temperatures are suitably the temperature of said upper plate of said hot pressing apparatus which contacts the powder of the nanoparticles having a polymer coating on the substrate. Suitably said bottom plate is not heated during the process.

Suitably the substrate and the powder of the nanoparticles having a polymer coating are hot pressed in step b) for a sufficient time to adhere the powder to the substrate and form the superhydrophobic film comprising an agglomeration of the nanoparticles having a polymer coating. Suitably the substrate and the powder of the nanoparticles having a polymer coating are hot pressed in step b) for at least 30 seconds, suitably for a least 1 minute. Suitably the hot pressing takes place for up to 10 minutes, suitably up to 5 minutes suitably up to 3 minutes. The hot pressing may take place for from 30 seconds to 5 minutes, suitably from 1 to 3 minutes, suitably for approximately 2 minutes.

The hot pressing method of such embodiments may be particularly suitable for nanoparticles coated with PVC, particularly for forming the superhydrophobic film on PVC substrates. Such PVC substrates have been difficult to reliably coat with a superhydrophobic film using known methods. The ability of the method of this third aspect to coat PVC substrates with superhydrophobic films of the present invention may allow a broader scope of industrial application compared to known methods, for example in fabrics, vehicle interiors, piping, sheeting, electrical cable insulating and housing (profiles), and flooring.

The formation of superhydrophobic films with PVC coated nanoparticles using spray or dip coating may lead to cracking of the film during removal of solvent from the film. This can be avoided by using the hot pressing method. The hot press method may also provide a reduction in solvent use, with the associated cost and environmental benefits. Although solvent is used in the preparation of the polymer coated nanoparticles, this solvent can be captured and recycled as it is removed from the solution/suspension. Solvent capture at this stage is much more technically feasible than capturing solvent evaporated from a substrate coated with the polymer coated nanoparticle solution/suspension, for example by dip coating or spray coating, where excess solvent is likely to evaporate to the atmosphere. Therefore, there may be an overall reduction in solvent usage/wastage in the hot pressing method.

According to a fourth aspect of the present invention, there is provided a formulation for coating an article with a superhydrophobic film, the formulation comprising nanoparticles having a polymer coating.

In some embodiments the formulation comprises a diluent. Suitably the diluent is a solvent. In some embodiments the formulation is therefore a liquid.

In such embodiments, the concentration, with respect to the nanoparticles, of the formulation may be from 0.01 to 1 M, suitably from 0.05 to 0.5 M, suitably from 0.05 to 0.3 M.

The formulation may have any of the suitable features and advantages of the solution/suspension of nanoparticles having a polymer coating described in relation to the third aspect. The nanoparticles and polymer may have any of the suitable features and advantages of the nanoparticles and polymer described in relation to the first, second and third aspects.

The formulation of this fourth aspect may be a ready-to-use formation which can be used in a suitable coating method to form a superhydrophobic film on a substrate, for example spray coating or dip coating. Suitably the formulation is provided in a sealed container.

The formulation of this fourth aspect may provide a convenient and versatile formulation for forming durable superhydrophobic films on a variety of substrates, in order to provide said substrates with the functional advantages such superhydrophobic films provide. Suitably the nanoparticle, polymer and solvent are selected, suitably from the options described herein, to provide a stable formulation which is effective in forming a superhydrophobic film, when applied to a substrate using a suitable method.

In some embodiments, the formulation is a solid comprising nanoparticles having a polymer coating, suitably a powder. Such a formulation may be suitable for use in a hot press method of forming a superhydrophobic film, as described in relation to the third aspect.

EXAMPLES

Materials

Sylgard-184 (Silicone elastomer, PDMS) was purchased from Ellsworth Adhesive Ltd. Multi-purpose adhesive was purchased from 3M. Titanium dioxide (Aeroxide P25, 24±7 nm), cerium oxide (27±14 nm), triethylamine (>99%) and 1H, 1H, 2H, 2H-perfluorooctyltriethoxysilane (98%) were purchased from Sigma Aldrich. Hexane (HPLC grade) and ethanol (analytical reagent grade) were purchased from Fisher Scientific Limited.

Comparative Example 1—$TiO_2$/FAS Film

Comparative Example 1 superhydrophobic $TiO_2$/FAS film was prepared as follows. Nanoparticles of $TiO_2$ (0.5 g) were added to a solution of 1H,1H,2H,2H-perfluorooctyltriethoxysilane (FAS) (0.196 mmol, 0.076 ml) in ethanol (12.5 ml) and mechanically stirred for 1 hour. Hexane (2 mL) and multi-purpose adhesive (4 mL) were mixed together. One layer of this solution was pipetted over a glass slide to obtain full coverage on the glass slide of the film of Comparative Example 1.

Comparative Example 2—$CeO_2$/FAS Film

Comparative Example 2 superhydrophobic $CeO_2$/FAS film was prepared as above using $CeO_2$ in place of the $TiO_2$, with the additional step of adding a catalytic amount of triethylamine (7.94 mmol, 1.1 ml) to the ethanol solution of FAS and $CeO_2$ to encourage formation of the monolayer.

Comparative Example 3-1:10 $TiO_2$:$CeO_2$/FAS Film

Comparative Example 3 superhydrophobic 1:10 $TiO_2$:$CeO_2$/FAS film was prepared as above using a 1:10 ratio of $TiO_2$:$CeO_2$ in place of the $CeO_2$.

Example 1—$TiO_2$/PDMS Film

Example 1 superhydrophobic $TiO_2$/PDMS film was prepared as follows. $TiO_2$ nanoparticles (2.91 mmol, $TiO_2$ 0.23 g) were suspended in ethanol (10 mL). A 10:1 mass ratio of base (Sylgard-184) and curing agent (which contains $HSiR_3$ and Pt catalyst) of the silicone elastomer (PDMS) (0.165 g) were dissolved in hexane (10 mL) and mixed to ensure complete dissolution. The resultant PDMS/hexane solution was added to the nanoparticle sol and mechanically stirred for 3 hours.

Example 2—$CeO_2$/PDMS Film

Example 2 superhydrophobic $CeO_2$/PDMS film was prepared as above using $CeO_2$ (0.5 g) in place of the $TiO_2$.

Example 3-1:10 $TiO_2$:$CeO_2$/PDMS Film

Example 3 superhydrophobic 1:10 $TiO_2$:$CeO_2$/PDMS film was prepared as above using a 1:10 ratio of $TiO_2$:$CeO_2$ in place of the $TiO_2$.

Film Formation by Spray Coating

The films of Comparative Examples 1-3 and Examples 1-3 were also formed by spray-coating using a compression pump and artist spray gun at a pressure of 2 bar. All spraying was carried out approximately 4 cm away from the surface of the substrate.

The nanoparticle sol of Comparative Examples 1-3 was spray-coated onto the glass side (3 layers, approximately 4 cm from the slide), and allowed for dry for 15 minutes.

The films of Examples 1-3 were formed as follows. A temperature probe was set to 50° C. and a layer of PDMS (0.22 g)/hexane (10 ml) solution was spray-coated onto a hot glass slide and left for 30 minutes to part cure. Following this, the temperature probe was then set to 125° C. and the nanoparticle sol was spray-coated onto the hot glass slide (2 layers, approximately 4 cm from the slide) and left for a further 30 minutes.

UV Degradation Tests

Samples were exposed to UV irradiation using a UV lamp of 365 nm wavelength, which was situated 6.8 cm above coated slides.

Characterization of Films

Surface morphologies of coatings were analysed using a scanning electron microscope (SEM) (JEOL JSM-7001F) operating at an acceleration voltage of 20 kV. This instrument had a built-in INCA X-act EDX detector. Samples were vacuum sputter coated in a thin layer of chromium to improve electrical conductivity. A transmission electron microscope (JEOL 2100F) was used at an acceleration voltage of 200 kV in both transmission (TEM) mode and scanning transmission (S/TEM) mode using a CEOS GmbH "CESCOR" aberration correction system. FTIR measurements were taken using a Bruker Optics' Vertex 70 over a range of 450 to 4000 cm−1. UV-Vis diffuse reflectance spectra were obtained using a Cary 5000 UV-Vis-NIR Spectrometer in the range of 200-600 nm. Static WCA measurements were taken using a DSA100 Expert Drop Shape Analyser using Young-Laplace operating mode and the manual setting to record WCAs; 6 µl water droplets were used and WCAs were averaged over 5 areas. Tilting angles were recorded manually by dropping a water droplet on the surface and tilting the surface, recording the angle at which the droplet began to roll; an average was taken over 5 areas. Water bouncing videos were recorded using a high speed camera where an average of 4 videos was used for each coating. 6 µl water droplets were dispensed from a 30 gauge dispensing tip positioned 20 mm above the substrate surface.

Performance of Films

For the PDMS films of Examples 1-3, nanoparticles were blended together and suspended in ethanol, prior to mixing with a thermosetting PDMS polymer, as described above. A suspension formed which required mixing before use. This led to the formation of a range of particle aggregates which facilitated a highly rough, hierarchical surface morphology in the resultant coatings. These particle agglomerates dispersed well in a mixed solvent system of ethanol and hexane, requiring no pre-treatment prior to use.

During the film preparation process, the substrate was first spray-coated with a semi-cured layer of PDMS. This provided a water repellent base (cured during second spray coating), which also encapsulated functionalized nanoparticles; this approach was aimed at increased hydrophobicity, and durability (FIG. 1).

Unmixed titania and ceria composite coatings were fabricated alongside coatings made up of various ratios of titania and ceria. A ratio of 1:10 $TiO_2$:$CeO_2$ was discovered to have the greatest resilience to UV irradiation (maintaining WCA after 16 hours), and so was investigated further. The Comparative Examples 1-3 ($TiO_2$-FAS, $CeO_2$-FAS and 1:10 $TiO_2$:$CeO_2$ 1:10/FAS films) were prepared from suspensions of particles in a 99% ethanol/1% FAS solution, deposited onto pre-treated glass substrates (pre-treated with a hexane/adhesive mix used to strengthen films) using spray coating techniques.

The resultant Example and Comparative Example coatings appeared to be homogenous and visually bright white or off-white depending on whether nanostructured coatings were comprised from predominantly $TiO_2$ or $CeO_2$. Ceria has a natural pale-yellow pigmentation, so blending of particles with titania provided a slight increase in the white pigmentation of the coating. UV-Vis diffuse reflectance spectra was used to confirm this.

Fourier transform infrared (FTIR) was carried out to analyse the surface coating of Examples 1-3, which exhibited absorption peaks consistent with PDMS; 2962 $cm^{-1}$ representative of asymmetric $CH_3$ stretching in Si—$CH_3$, 1258 $cm^{-1}$ showing the $CH_3$ symmetric deformation of Si—$CH_3$, 1065 $cm^{-1}$ and 1010 $cm^{-1}$ arising from Si—O—Si stretching vibrations and 790 $cm^{-1}$ characteristic of the Si—C stretching vibration, respectively. Additionally, FTIR was carried out for particles which had been modified with a self-assembled monolayer of FAS, where all spectra agreed with expectations.

FIGS. 1*a* and 1*b* depict TEM images of as received P25 $TiO_2$ (80:20 anatase:rutile) and $CeO_2$ nanoparticles used in coatings with measured average diameters of 23 nm and 28 nm. $TiO_2$ particles were predominantly uniform in size and shape, whereas $CeO_2$ nanoparticles displayed a greater distribution in size and irregularity in shape. Initially, both particles displayed no exterior coating. However, an amorphous layer surrounding particles was detected via S-TEM after PDMS coating, as seen in FIG. 1*c*. The external PDMS coating was measured to be of approximately 7.1 nm thickness. Energy dispersive X-ray spectroscopy (EDS) of $TiO_2$-PDMS was used to further investigate the chemical composition of the coating (FIG. 1*d*). EDS mapping was carried out showing a high density of titanium, silicon and oxygen in areas where $TiO_2$-PDMS particles were present.

Figure 2:
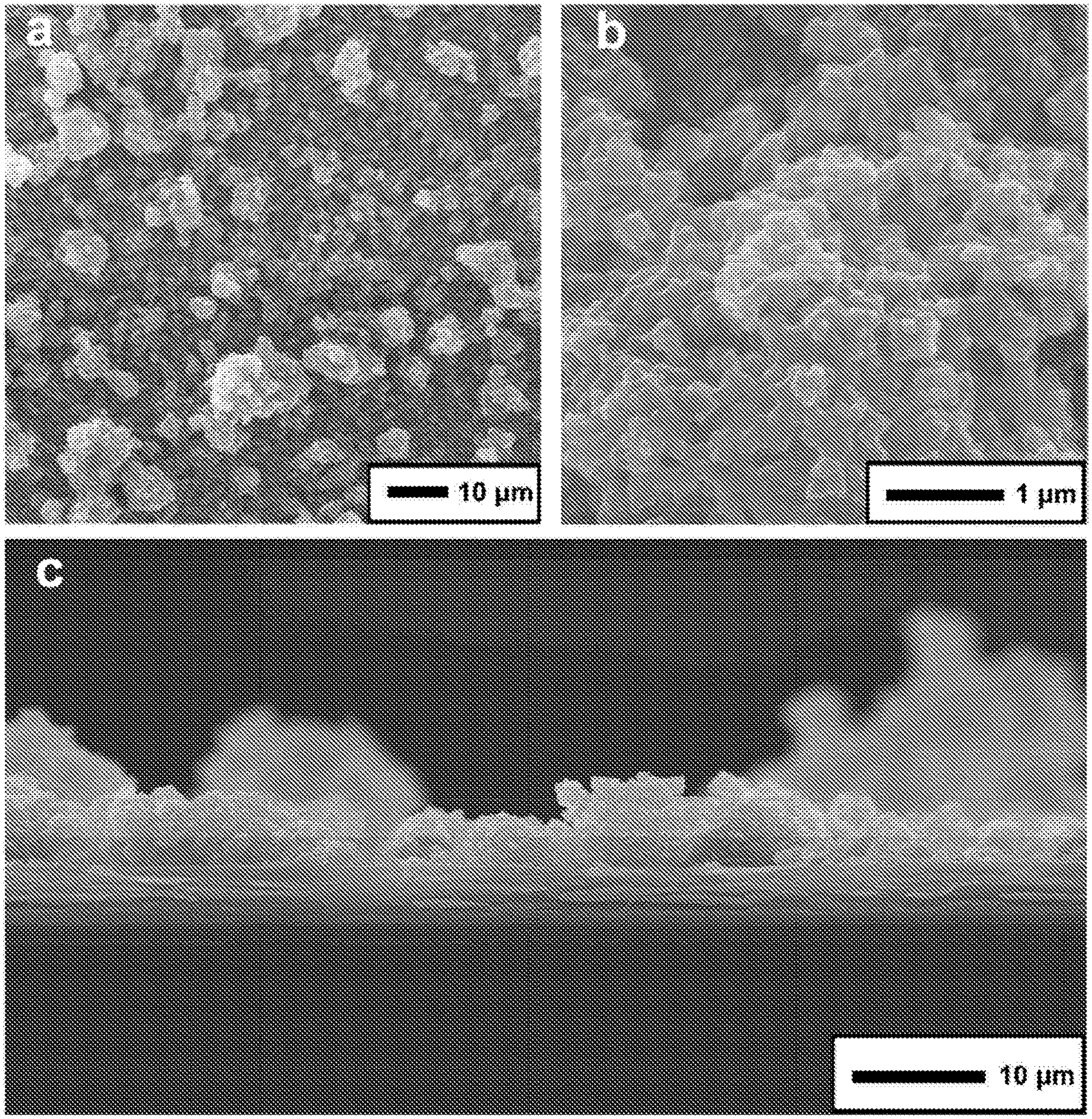

Surface morphologies were analysed by SEM. FIG. 2 shows top down (FIGS. 2*a* and 2*b*, at ×1,000 and ×20,000 magnification respectively) and side-on (FIG. 2*c*, at ×1,500 magnification) SEM images of PDMS-modified $TiO_2$ of Example 1. Irregular structures can be observed throughout the film creating substantial hierarchical surface roughness from agglomeration of particles during the sol-gel/spray-coating processes. The coating was formed from PDMS-coated microstructures attached to a glass substrate where an additional base layer of thermosetting PDMS could be seen on SEM images. An average film thickness was estimated to be between 12-16 µm, comprising a 4 µm PDMS base layer and a layer of polymer coated nanoparticles measured to be between 8-12 µm. However, microstructures ranging up to 43 µm could be seen distributed across the surface as a result of the spraying technique used to coat substrates. EDS spectra of the films were taken confirming the presence of all expected elements.

The thickness of polymer coating surrounding the $TiO_2$ nanoparticles impacted the resultant superhydrophobicity of films. An inadequate mass of PDMS led to a non-uniform coating with varied hydrophobicity, due to exposure of underlying substrate material. However, an excess of PDMS would cause loss of hydrophobicity, due to a lowering of surface roughness. Therefore, an optimum ratio between nanoparticle and PDMS exists, whereby the greatest WCAs were attained by ensuring complete particle coverage whilst maintaining a high surface roughness. Various relative amounts of PDMS to $TiO_2$ were investigated, ranging from 10 to 70 wt % PDMS in the $TiO_2$/PDMS mixture, to investigate the relationship between polymer mass and WCA. The critical mass of PDMS was established to be in the region of 30-40 wt %. A decrease in WCA was detected past this weight percentage most likely due to the displacement of trapped air in between surface protrusions by excess polymer, consequently modifying surface morphology and lowering overall surface roughness.

UV Durability of Coatings

Figure 3:
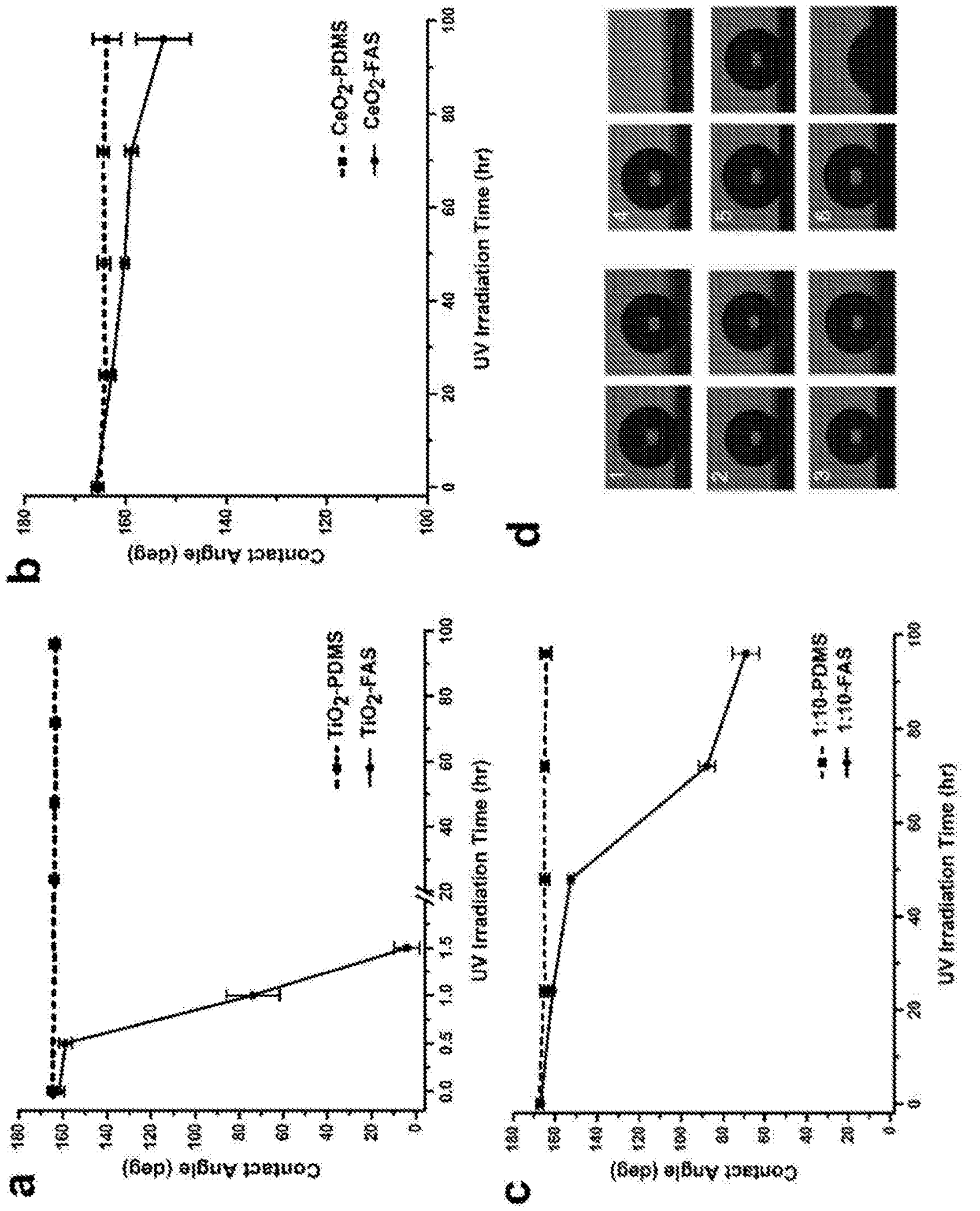

A plot of WCAs under UV irradiation over time is shown in FIG. 3 which shows variation in WCA under UV irradiation for (a) Example 1 and Comparative Example 1; (b) Example 2 and Comparative Example 2; and (c) Example 3 and Comparative Example 3; (d) the shape of water droplet on composite surfaces after 0 hr and 96 hr UV irradiation for (1) Example 1; (2) Example 2; (3) Example 31; (4) Comparative Example 1 (0 hr and 90 minutes); (5) Comparative Example 2 and (6) Comparative Example 3.

Exposure to UV rays, comparable to those that furthest penetrate the Earth's atmosphere (UVA), was carried out by utilising a UV lamp (wavelength ~365 nm). This provided an indication of the resilience of the films to exposure to solar radiation. The dashed lines indicate the WCAs of PDMS-coated samples (Examples 1-3). Initially, $TiO_2$-PDMS (Example 1) displayed a WCA of 164.3° (CAH=1.5°) which showed negligible change after 96 hr irradiation time, decreasing by <1° to 163.5° (CAH=1.8°). In contrast the Comparative Examples 1-3 (solid lines) showed drops in WCA on UV light exposure, which was most apparent for the $TiO_2$ containing films (Comparative Examples 1 and 2). The primary interaction between $TiO_2$ and PDMS is known to be hydrogen bonding between the surface adsorbed hydroxyl groups of $TiO_2$ and backbone oxygen atoms of PDMS. Siloxanes are a class of polymer which have highly flexible backbones, therefore it is possible that a combination of high surface coverage through extensive intermolecular interactions and excellent backbone flexibility, enabled PDMS to suppress the photo-degradation caused by $TiO_2$ particles. This subsequently led to pigmented coatings with extreme UV resistance. The high photocatalytic activity of $TiO_2$ was probed further by the FAS system (Comparative Examples 1-3). The inclusion of $CeO_2$ promoted e−h+ recombination, and thus decreased photocatalytic activity. $TiO_2$/FAS (Comparative Example 1) underwent a photo-induced transformation from superhydrophobic (161.8°) to superhydrophilic (4.2°), after just 90 minutes of UV irradiation. This transition was also tracked using FTIR, where a reduction in the intensity of peaks representative of FAS could be seen. By contrast, $CeO_2$ nanostructured films (Comparative Example 2) withstood the full duration of 96 hr irradiation without losing superhydrophobicity (from 166.0° to 152.5°) showing remarkably less photo-catalytic activity, although, increased water-surface adherence was evident.

Mixed-phase systems were examined, including 1:10 $TiO_2$:$CeO_2$/FAS (Comparative Example 3), which showed superhydrophobicity was lost shortly after 48 hr (from 166.8° to 152.5°), followed by a significant reduction in WCA at 72 hr and 96 hr (87.8° and 69.3°), respectively.

To enhance UV resistance further, the effect of PDMS and ceria were combined in Examples 2 and 3. Initially, films of Examples 3 and 2 displayed WCAs of 167.6° (CAH=1.7°) and 165.1° (CAH=1.7°) respectively, exceeding that of Example 1 (FIGS. 3*b* and 3*c*). After 96 hr of exposure to UV irradiation, variation in WCA was minimal showing a reduction of 3° for Example 3 (CAH=2.5°) and 1.5° for $CeO_2$/PDMS (CAH=2°). Resultant WCAs were found to be very similar to that of Example 1. The additional UV resilience provided by $CeO_2$ was probed in extended studies, whereby films were exposed to a maximum of 250 hr intense irradiation. This resulted in a WCA of 160°, and 162° for Example 1, and Example 2 respectively. Water roll-off properties were maintained after extended periods of irradiation on all PDMS films (Examples 1-3), ensuring functional self-cleaning surfaces. Furthermore, superhydrophobicity was still observed after three months of films being left under ambient conditions indicating potential effectiveness in to real-life applications.

Water Bouncing

The interaction of water with PDMS composite films (Examples 1-3) was captured using a high-speed camera (1000 Frames per second). 6 μl water droplets were dispensed from a 27 gauge dispensing tip positioned 20 mm above the substrate surface as this had previously been determined as the height where water droplets carry maximum momentum. The average number of water bounces was found to be typically proportional to the observed CA of any given coating; $TiO_2$/PDMS (Example 1) displayed an average 11.5 water bounces, $CeO_2$/PDMS (Example 2) displayed 12 water bounces and 14 could be seen for 1:10 $TiO_2$:$CeO_2$/PDMS (Example 3). This can be explained by a greater distribution in particle size from a combination of two inorganic oxides used in Example 3, giving heightened surface roughness that subsequently led to a greater number of bounces.

Summary

The Example films utilise nanoparticles and hydrophobic polymers to provide the high surface roughness having the water repelling properties required to provide a superhydrophobic film. This includes an optimised polymer:nanoparticle ratio, aimed at providing both maximised surface roughness and complete substrate coverage. The robustness of the polymer-encapsulated nanoparticles may be further enhanced through the use of a surface pre-treatment, which enables physical binding to the underlying substrate.

The use of titanium dioxide in superhydrophobic films has been limited because of the photocatalyst action of $TiO_2$ which can degrade organic polymer coatings on exposure of the surface to UV light (including sunlight)—as seen in Comparative Examples 1 and 2. However, the polymer coating of the Examples of the present invention appear to prevent the superhydrophobic film from undergoing such degradation. Examples comprising $CeO_2$ may also further dampen this photocatalytic activity.

Examples 4-7—Polyolefin Coatings

Materials

All chemicals were purchased from Sigma-Aldrich: hexamethyldisilazane (≥9.0%), toluene (≥9.98%), xylene (≥9.83%), methylene blue (≥82.0%), high density polyethylene, polypropylene, $SiO_2$ nanoparticles (10-20 nm) and $TiO_2$ nanoparticles (21 nm).

Functionalisation of $SiO_2$ and $TiO_2$ Nanoparticles with HDMS

Nanoparticles (5 g) were added into a 500 ml round bottom flask containing toluene (100 ml). In a separate flask, 0.5 ml of HMDS was added to toluene (100 ml). Both mixtures were stirred for 30 min to ensure good dispersion. The reaction mixtures were combined for reflux at 160° C. for 24 h, with constant stirring. After the reaction was complete, particles were isolated using toluene, centrifuged (2000 rpm for 10 minutes) and further washed with ethanol. The precipitate was dried at 100° C. for 24 h.

Example 4—$SiO_2$/PE Film

Polyethylene (0.1 g) was weighed into a tall 100 ml beaker containing xylene (70 ml). The solution was heated to 110° C. with constant stirring for 20 minutes. Functionalised $SiO_2$ (amount varying according of polymer coating thickness desired, for example: for 1.5 nm coating—0.3472 g $SiO_2$; for 20 nm coating—0.0052 g $SiO_2$) was added and left to stir for 30 min to give polymer coatings ranging from 1 to 20 nm. Dip coating of the substrate into this suspension was then carried out.

Example 5—$TiO_2$/PE Film

Polyethylene (0.1 g) was weighed into a tall 100 ml beaker containing xylene (70 ml). The solution was heated to 110° C. with constant stirring for 20 minutes. Functionalised $TiO_2$ was added and the solution left to stir for 30 min. Dip coating of the substrate into this suspension was then carried out.

Example 6—$SiO_2$/PP Film

Polypropylene (0.1 g) was weighed into a tall 100 ml beaker containing xylene (70 ml). The solution was heated to 130° C. with constant stirring for 20 minutes. Functionalised silica (amount varying according of polymer coating thickness desired, for example: for 1.5 nm coating—0.3484 g $SiO_2$; for 2 nm coating—0.2457 g $SiO_2$; for 3 nm coating—0.1453 g $SiO_2$). Dip coating of the substrate into this suspension was then carried out.

Example 7—$SiO_2$/$TiO_2$/PE Film

Polyethylene (0.1 g) was weighed into a tall 100 ml beaker containing xylene (60 ml). The solution was heated to 110° C. with constant stirring for 20 minutes. Once the polyethylene was fully dissolved, 5 ml butanol was slowly added via a syringe. Pre-mixed $SiO_2$ and $TiO_2$ nanoparticles were added to the flask and stirred at 110° C. for 10 minutes to remove butanol. A further 10 ml of xylene was added before dip coating of the substrate was carried out.

Results

Example films 4-7 comprising thermoplastic polymer coatings were prepared as described above to further exemplify the present invention. To prepare these Examples, a different deposition technique was used to deposit films onto substrates, due to a specific temperature range being required to ensure full dissolution of the thermoplastic polymer, essential for homogenous coverage of the substrate. Unlike thermoset polymers, which cure upon heating, thermoplastics cure upon cooling and subsequently precipitate out of solution if the temperature falls below a given range. To optimize the dip coating process of particle/thermoplastic nanosuspensions, emersion and withdrawing rates, dipping and drying times, number of iterations and the concentration of the colloidal suspension were investigated using a $SiO_2$/PE (Example 4) solution in xylene. The optimised dip coating process was carried out as follows.

For Suspensions Containing Silica:

1. Thermoplastic polymer weighed out (0.1 g) and added to 100 ml beaker containing 70 mL xylene.
2. The solution was stirred and heated to >110° C. for PE or >130° C. for PP to ensure full dissolution of the polymer.
3. Surface chemistry of $SiO_2$ was modified using HMDS to ensure solvent/nanoparticle compatibility (method stated in experimental of report) and set to one side.
4. Once the polymer had fully dissolved and a clear solution was obtained, the exact mass of pre-functionalised silica was added to form a suspension of nanoparticles with a known polymer coating of average thickness x (nm).
5. This suspension was stirred for a further approx. 10-20 minutes whilst the temperature fell to the desired range (83-88° C. for PE or 68-70° C. for PP)—solvent was marked on beaker to ensure none was lost to evaporation during this period, keeping the concentration accurate.
6. Optimum settings were set on the dip coater (75 emersion rate (1530 mm/min), 10 seconds emersion time, 50 withdrawing rate (760 mm/min) and 10 seconds drying time).
7. A glass slide was attached to the dip coater and x iterations were carried out.
8. Slides were left for approx. 30 minutes to allow coatings to dry.

For Suspensions Containing Titania:

Pre-functionalisation with oleic acid lead to issues regarding the dispersity of particles in solution. Therefore, a mixed solvent system was prepared to aid the suspension of un-functionalised $TiO_2$ NP's in organic solvents.

1. Thermoplastic weighed out (0.1 g) and added to 100 ml beaker containing 60 mL xylene.
2. As above.
3. As above.
4. Once the polymer had fully dissolved and a clear solution was obtained, 5 mL butanol was slowly added via a syringe—slow enough to ensure polymer did not precipitate out of solution.
5. The exact mass of un-functionalised titania was added to form a suspension of nanoparticles with a known polymer coating of average thickness x (nm).
6. The temperature of the solution remained >100° C. with stirring for approx. 10 minutes to remove the majority of butanol (BP butanol; 118° C.).
7. The volume of solution was slowly increased to 70 mL to achieve the desired concentration, whilst avoiding premature polymer precipitation.
8. Steps 5-8 from above.]

Figure 4:
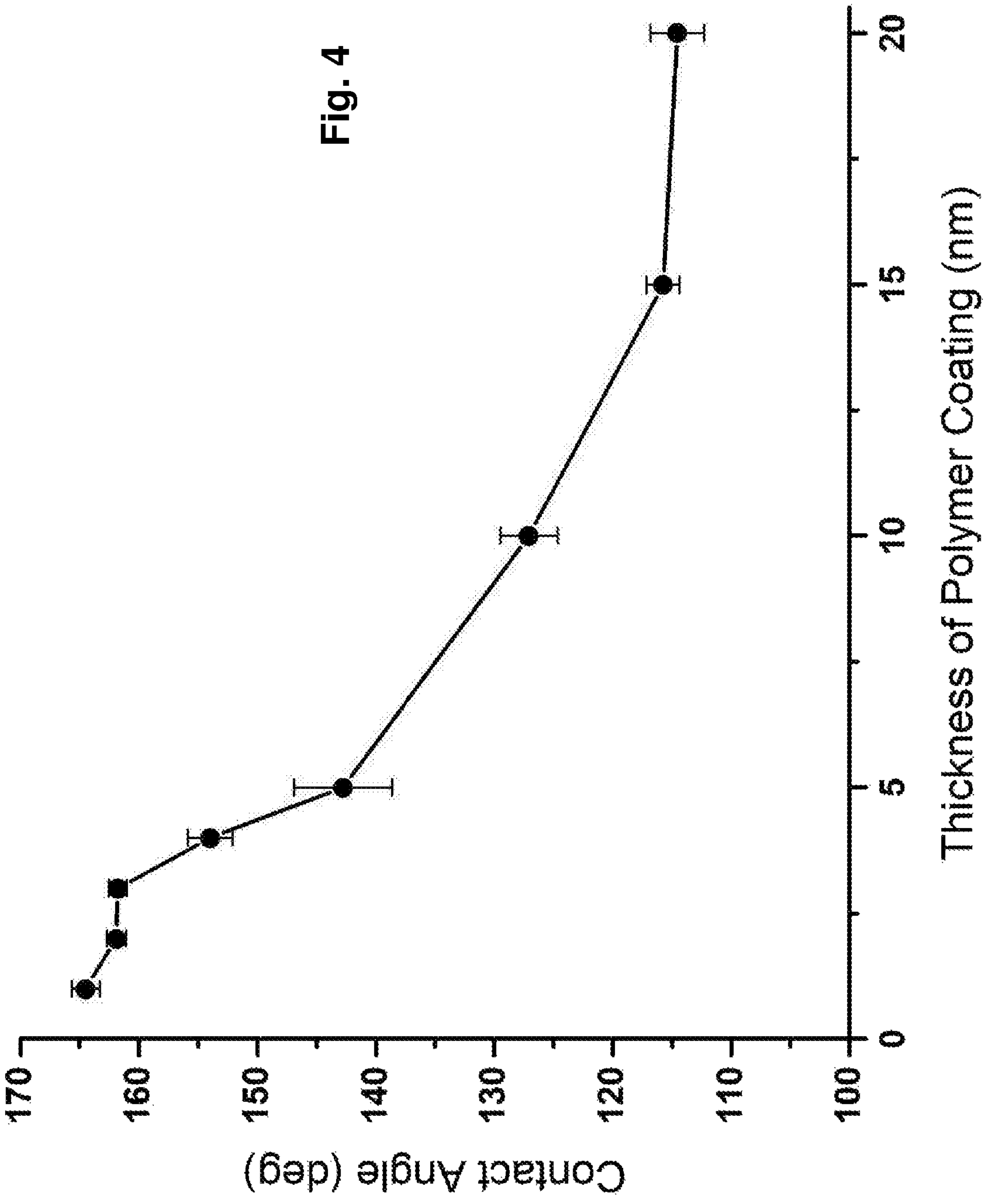
Figure 5A:
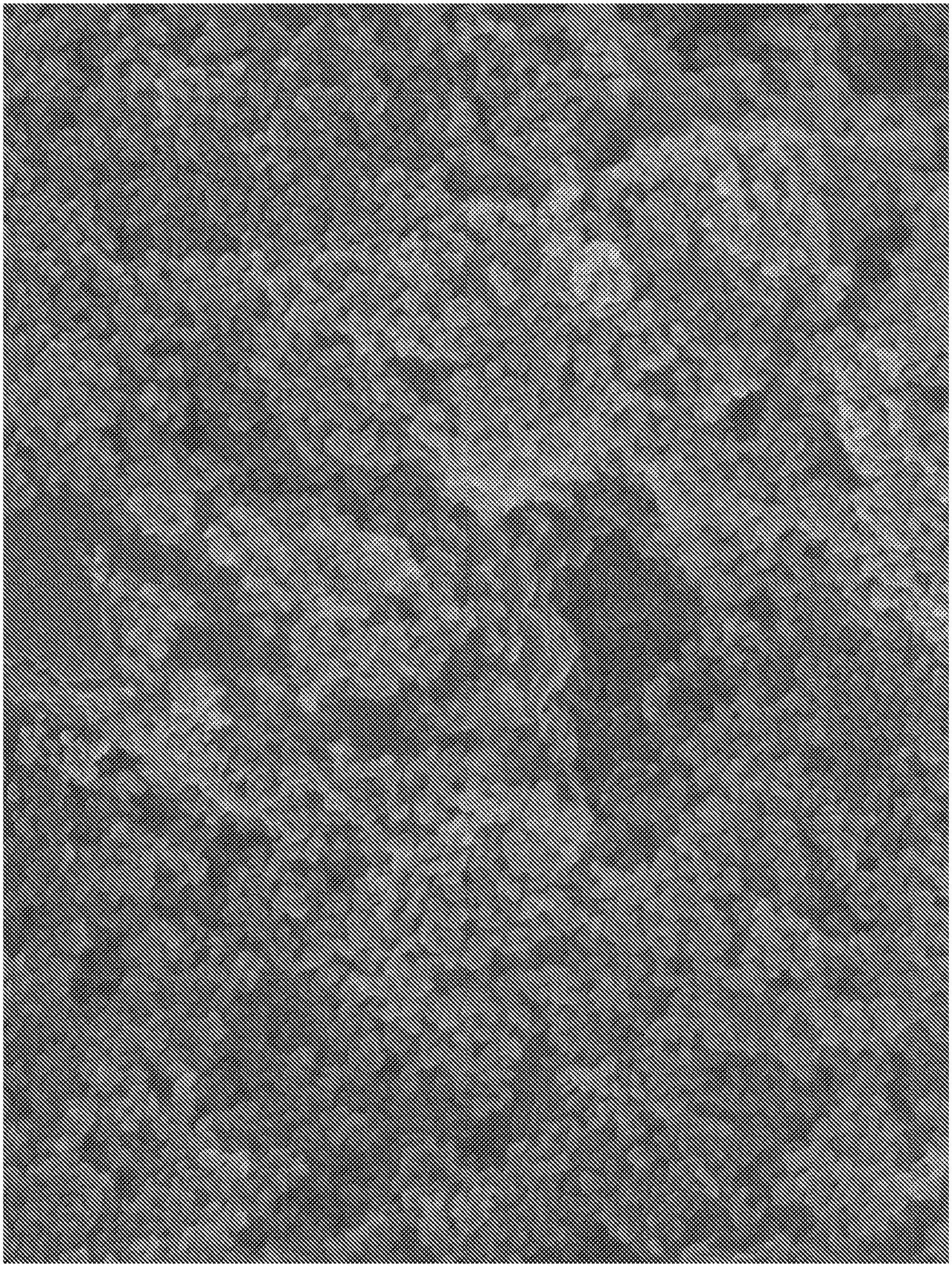
Figure 5B:
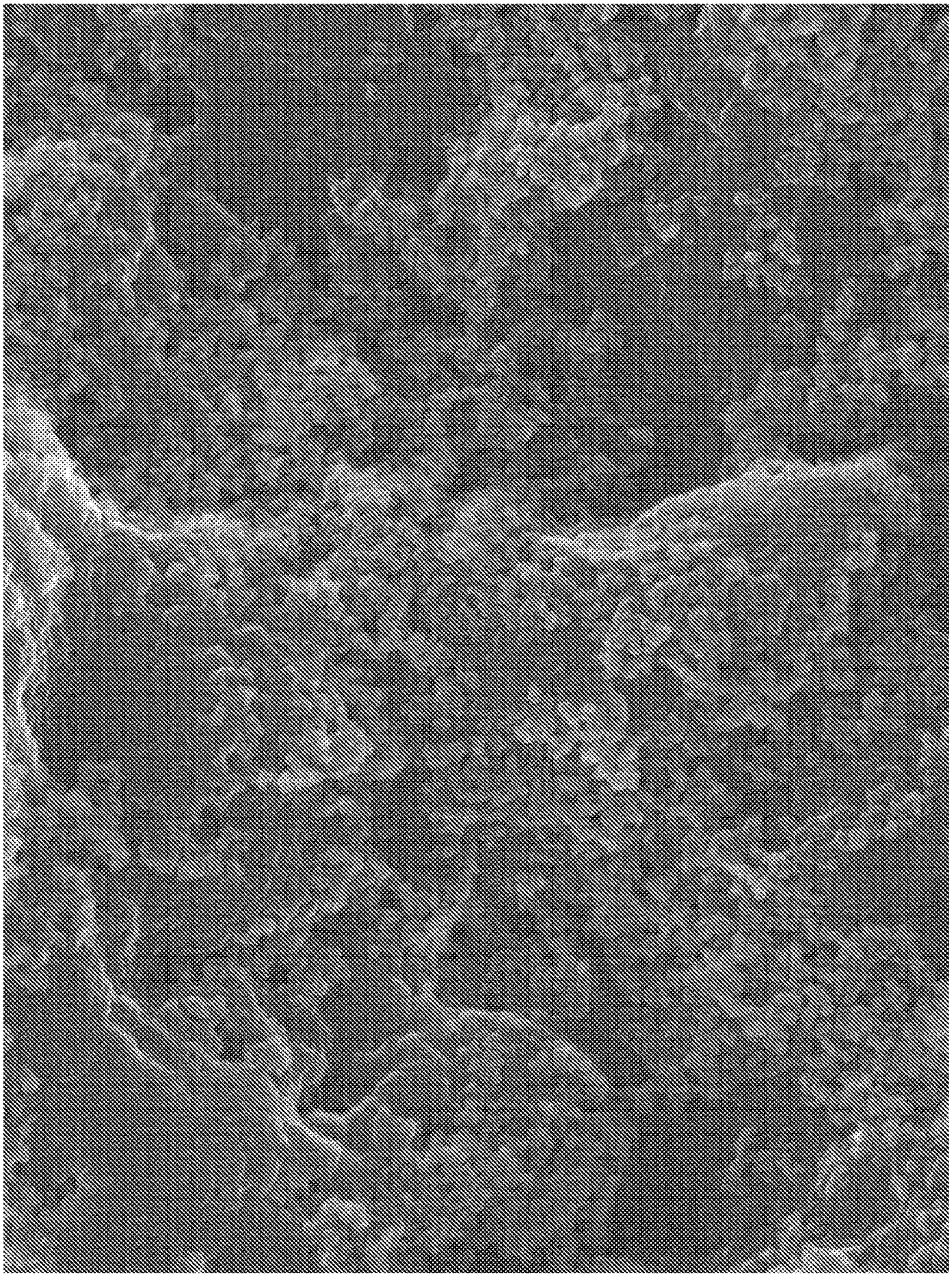
Figure 5C:
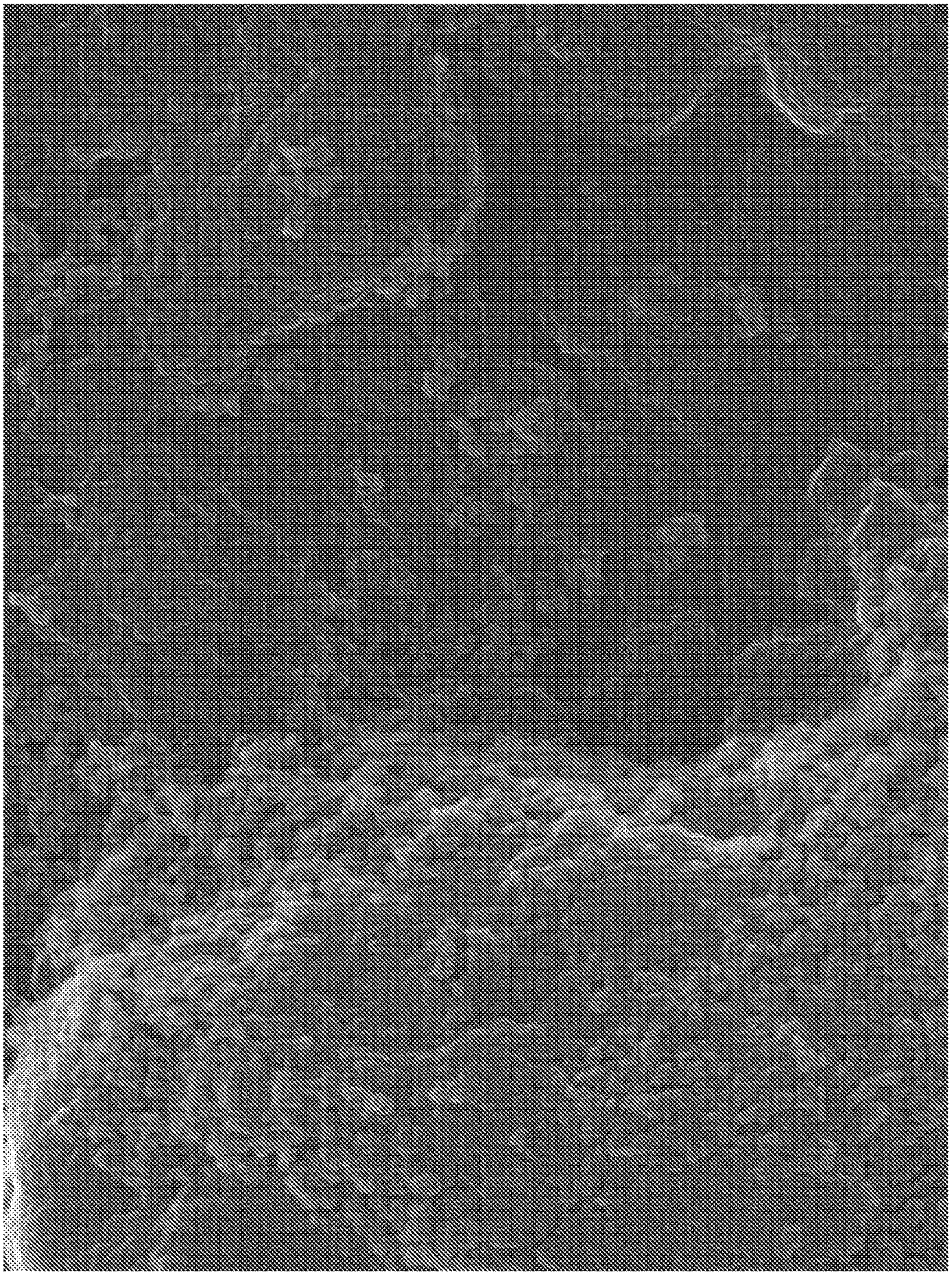

Superhydrophobic films based on $SiO_2$ nanoparticles used hexamethyldisilazane (HMDS) surface modified silica to induce hydrophobic functionality and ensure the solvent compatibility of colloidal suspensions. Problems associated with the solvent compatibility of oleic acid functionalised $TiO_2$ nanoparticles resulted in a mixed solvent system of xylene and butanol (12:1 vol) being used with un-functionalised $TiO_2$. Removal of butanol via evaporation was followed after inducing the coating of particles. The outcome of both fabrication methods was the same. After establishing the optimum settings of the dip coating instrument, to achieve the highest degree of superhydrophobicity, the relationship between polymer and particle ratio was investigated. To do this, the mass of $SiO_2$ nanoparticles suspended in dissolved polyethylene (PE) (a set concentration of 0.1 g in 70 ml xylene) was varied. Suspensions of nanocomposites were formulated with PE particle coatings on the nanoparticles having a thickness ranging from 1.5 nm to 20 nm. The resultant WCAs are displayed graphically in FIG. 4. FIG. 5 shows SEM images of superhydrophobic film composed from $SiO_2$/PE nanocomposites with an (a) 1.5 nm PE coating; (b) 2 nm PE coating; and (c) a 3 nm PE coating. As shown in FIGS. 4 and 5, a thicker polymer coating resulted in surface pores filling with excess polymer, consequently reducing surface roughness and limiting the amount of air that can reside in between surface protrusions. This in turn depressed superhydrophobicity and induced the surface adherence of water droplets. Films having a 1.5 nm PE coating on the nanoparticles were found to display the highest WCA (162°) due to a highly rough surface morphology engineered from nano- and micro-structures, and limited areas of flat polymer surface.

As stated above, there may be an optimum temperature range for forming the example superhydrophobic films, with polyolefins in particular. If the temperature falls below this, polymer begins to precipitate out of solution and can no longer coat particles. If the temperature is elevated above the desired range, polymer coatings are re-dissolved from the substrate and the resultant film is no longer superhydrophobic. The optimum temperature range was determined to be 85-87° C. for polyethylene. However, it is possible to achieve homogenous coatings between 83-88° C. by limiting extreme temperature jumps.

Figure 6:
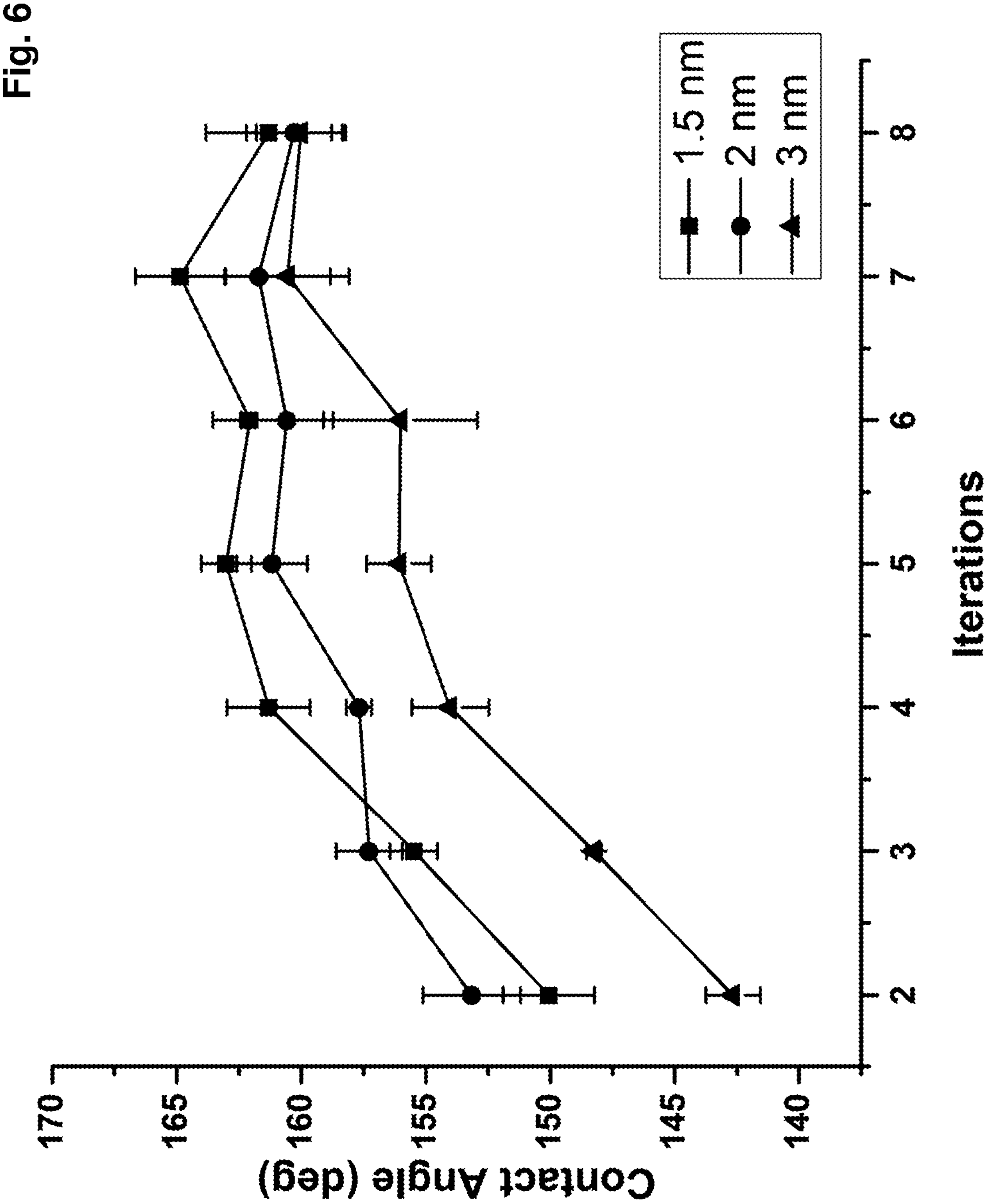

The number of film forming/coating cycles ("iterations") was examined with samples of $SiO_2$/PE compositions (based on Example 4) having PE coatings of thickness 1.5 nm, 2 nm and 3 nm on the nanoparticles to assess the necessary number of coatings required to generate superhydrophobic thin films. Seven iterations appeared to be the optimum number of cycles, yielding the highest WCAs in the case of all films, as seen in FIG. 6, which is a graph displaying the relationship between WCA and number of iterations for films fabricated from $SiO_2$/PE nanocomposites with 1.5 nm, 2 nm and 3 nm thick PE coatings. Further iterations beyond this resulted in a reduced WCA, possibly owing to the thicker coating which reduced the roughness of the surface.

Figure 7A:
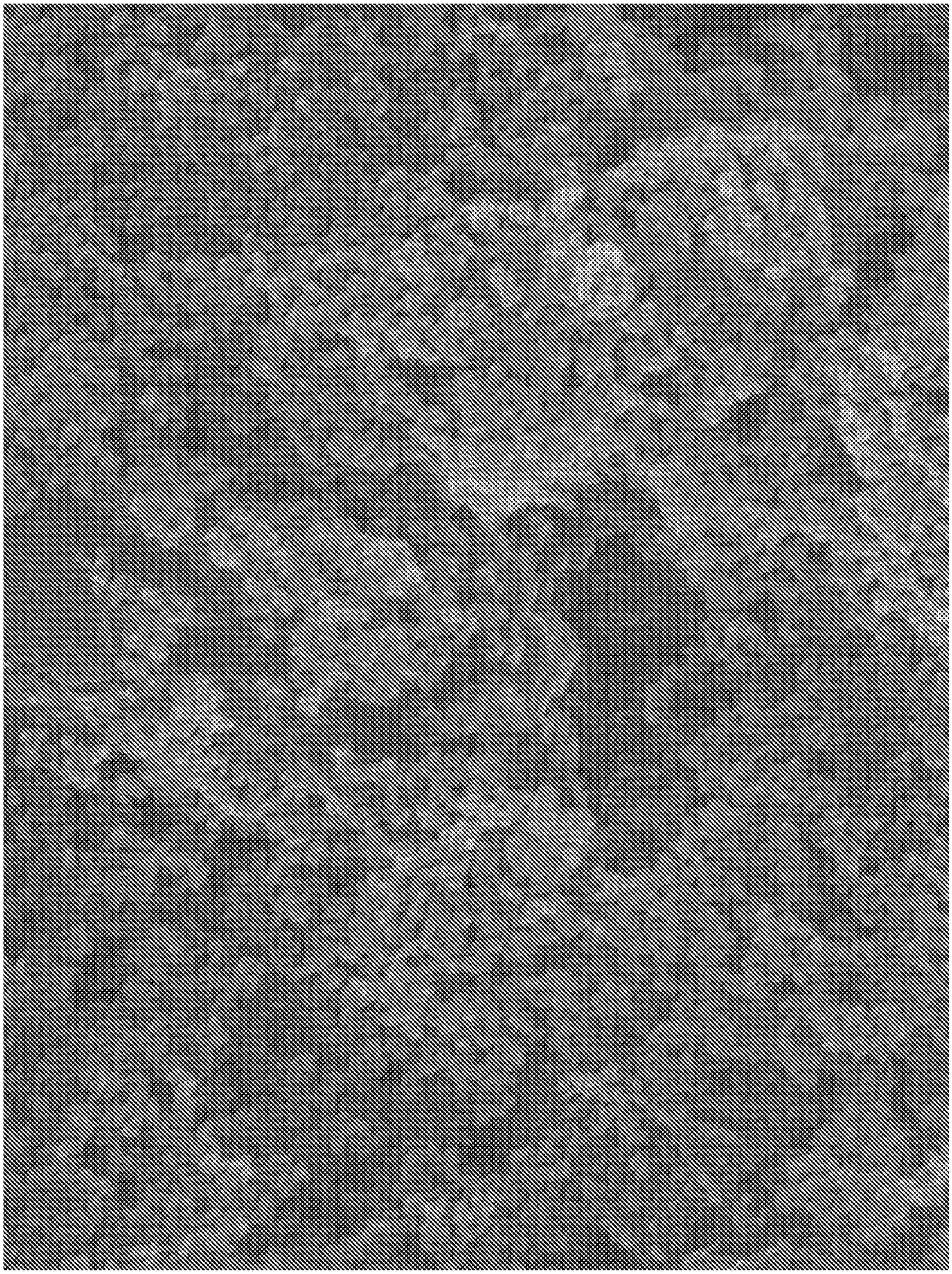
Figure 7B:
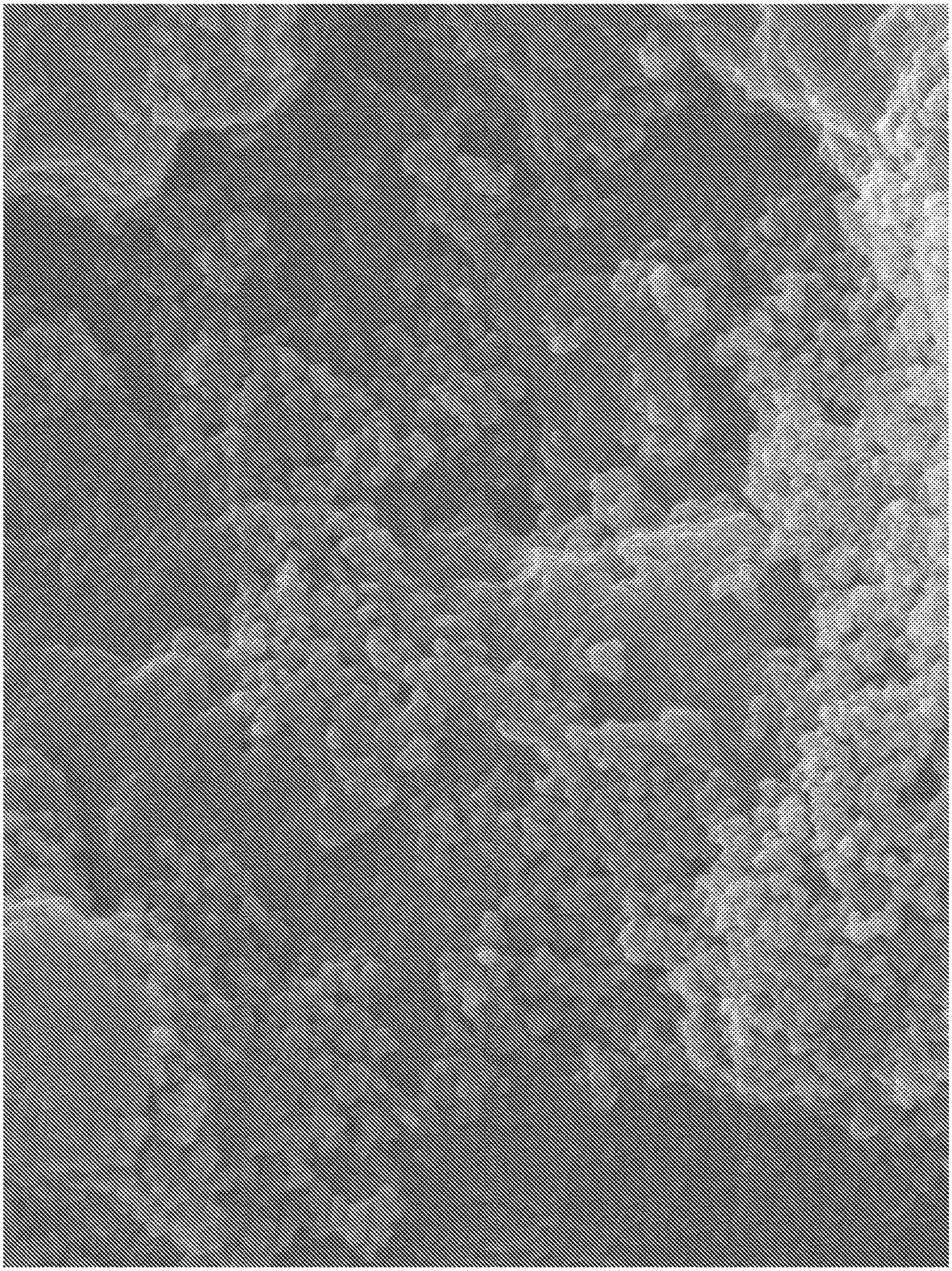
Figure 7C:
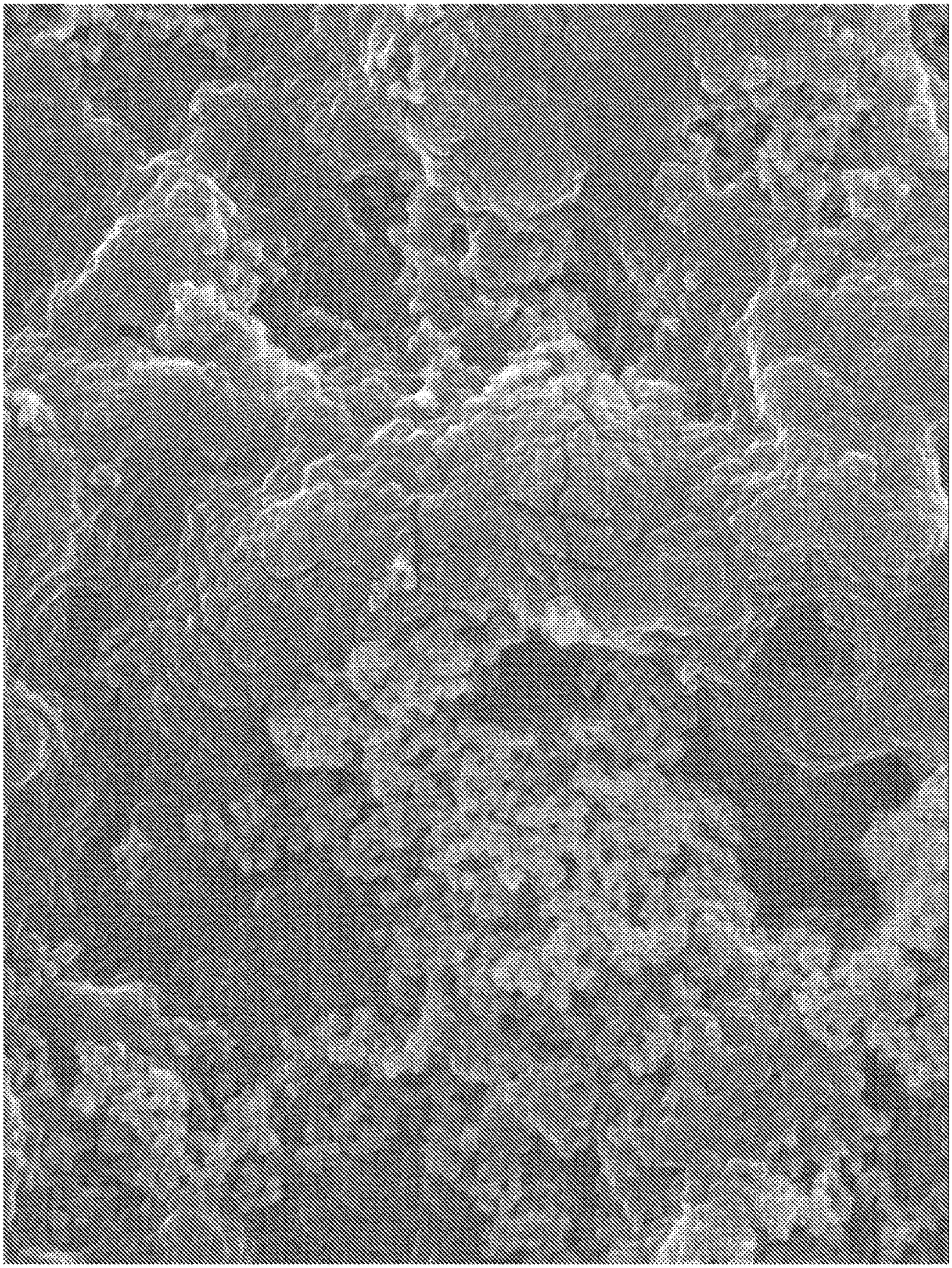

FIG. 7 shows SEM images of $SiO_2$/PE with a 1.5 nm PE coating fabricated from (a) 6 iterations, (b) 4 iterations and (c) 2 iterations.

Figure 8:
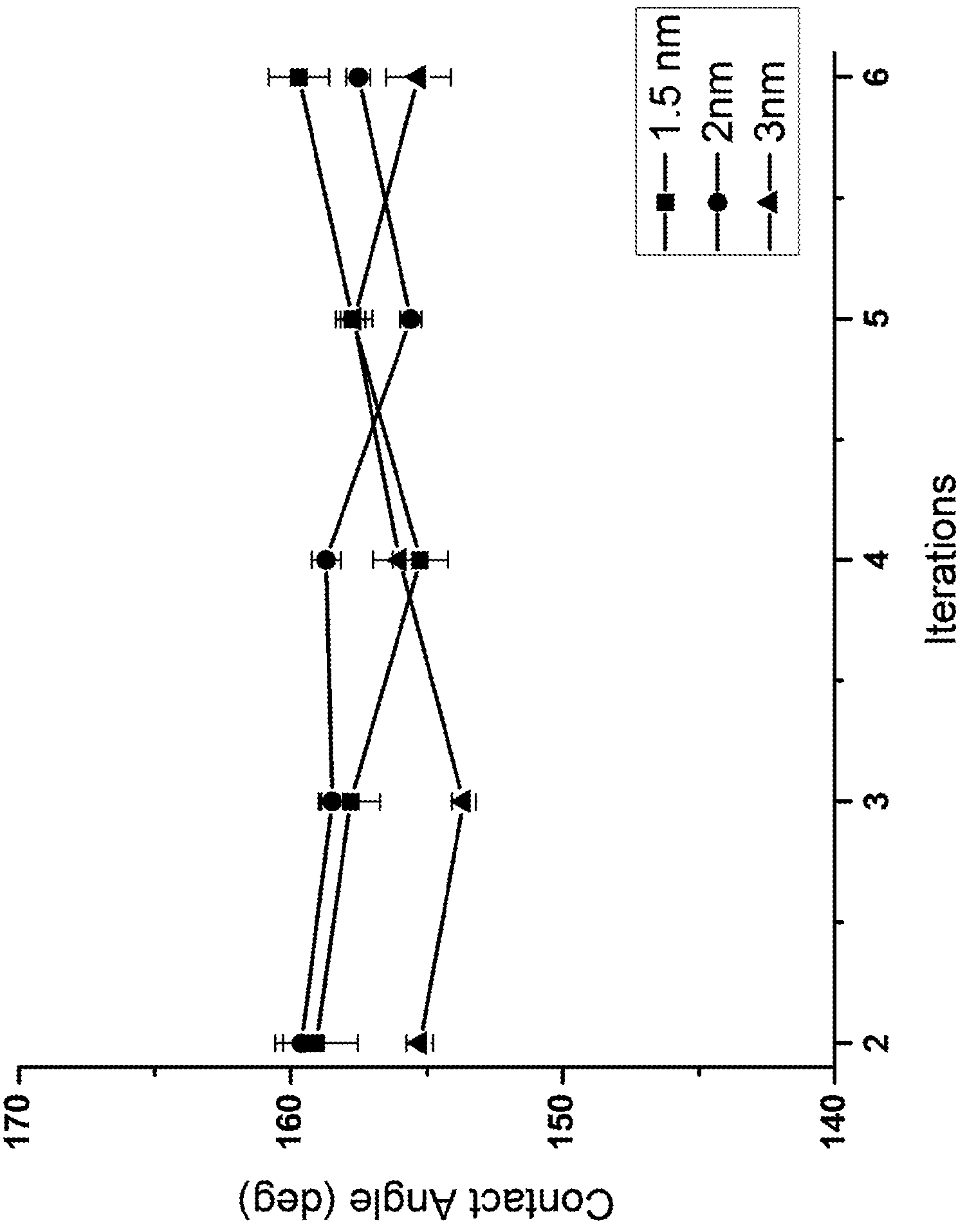
Figure 9A:
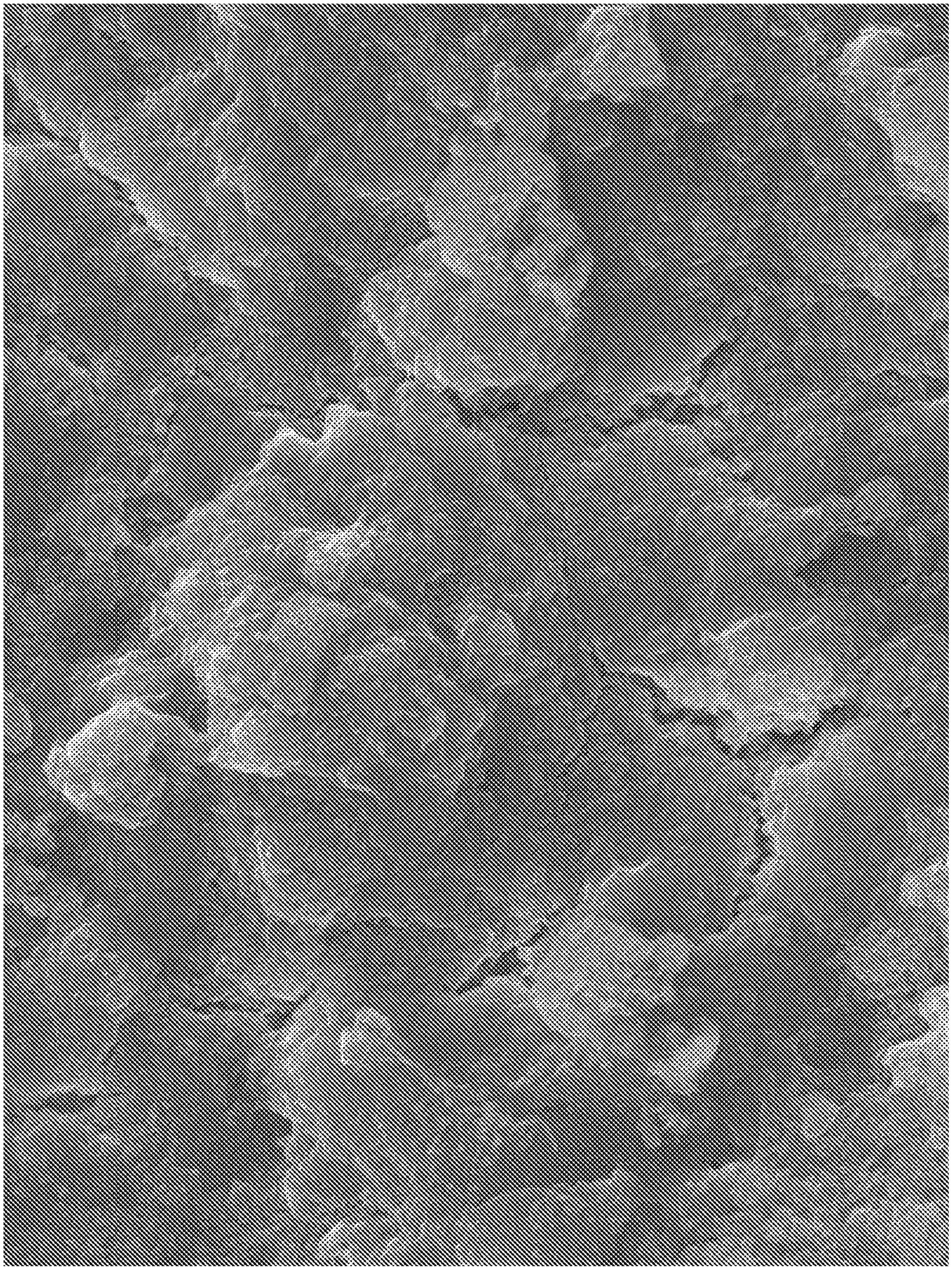
Figure 9B:
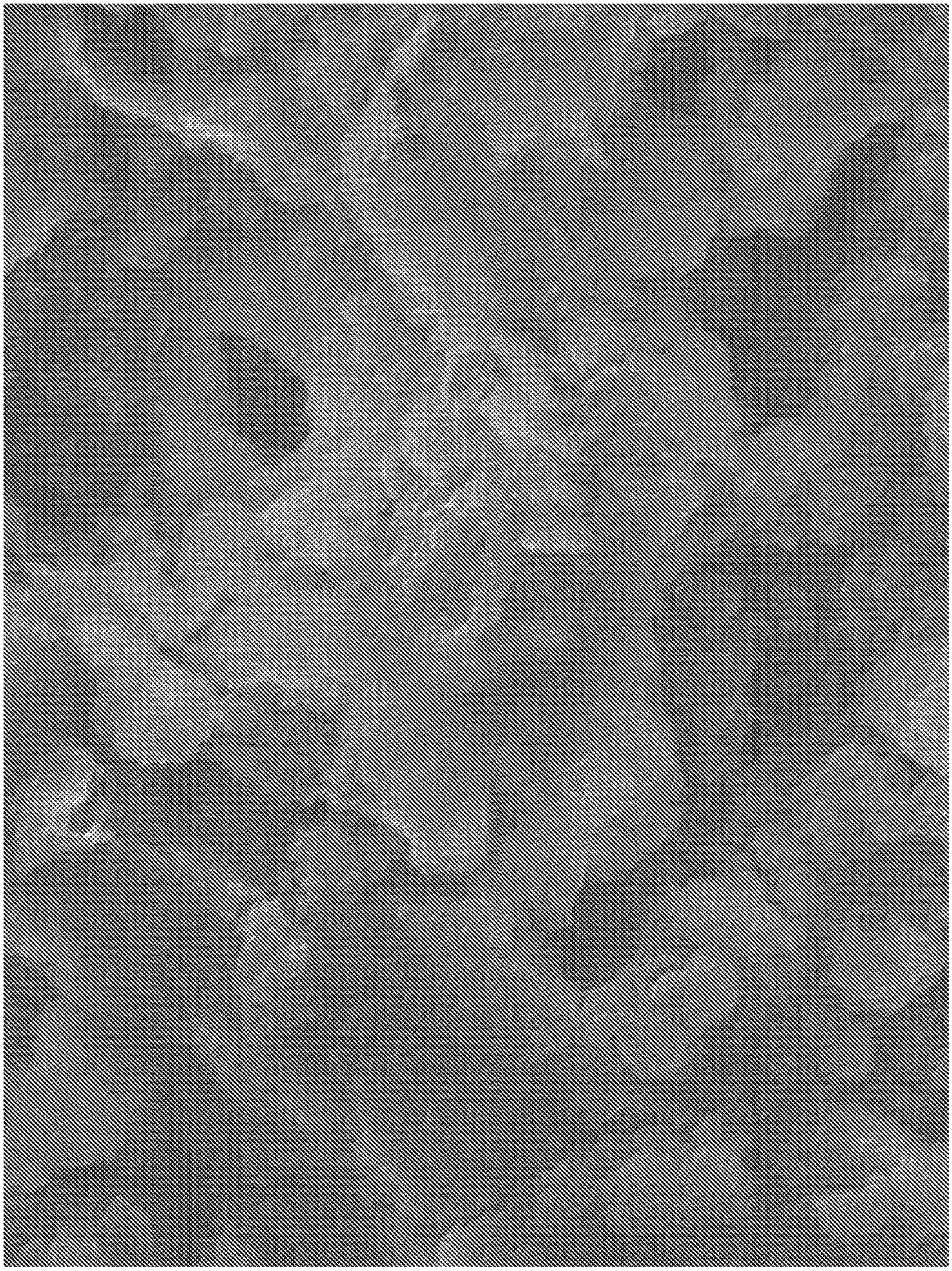
Figure 11A:
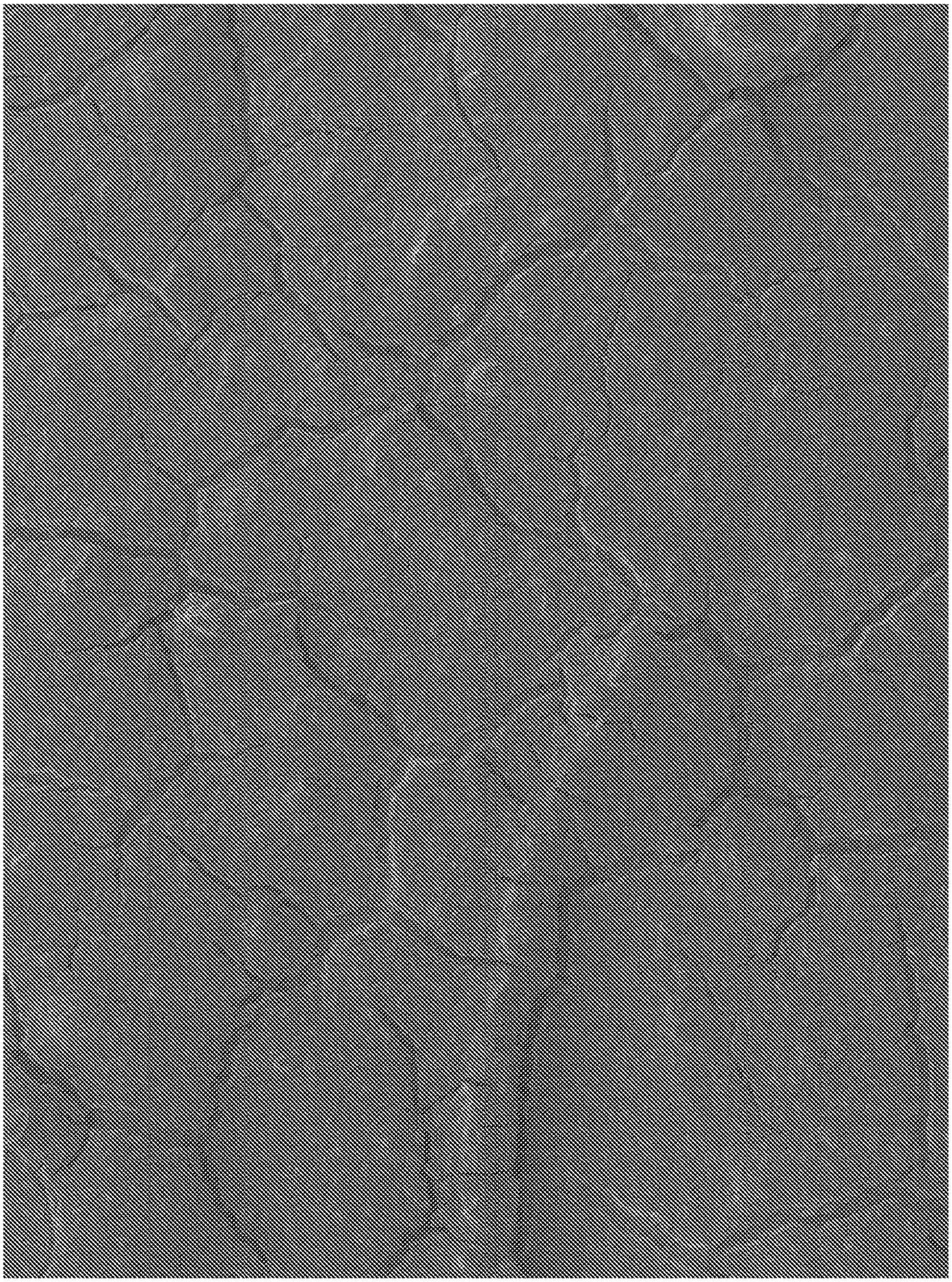
Figure 11B:
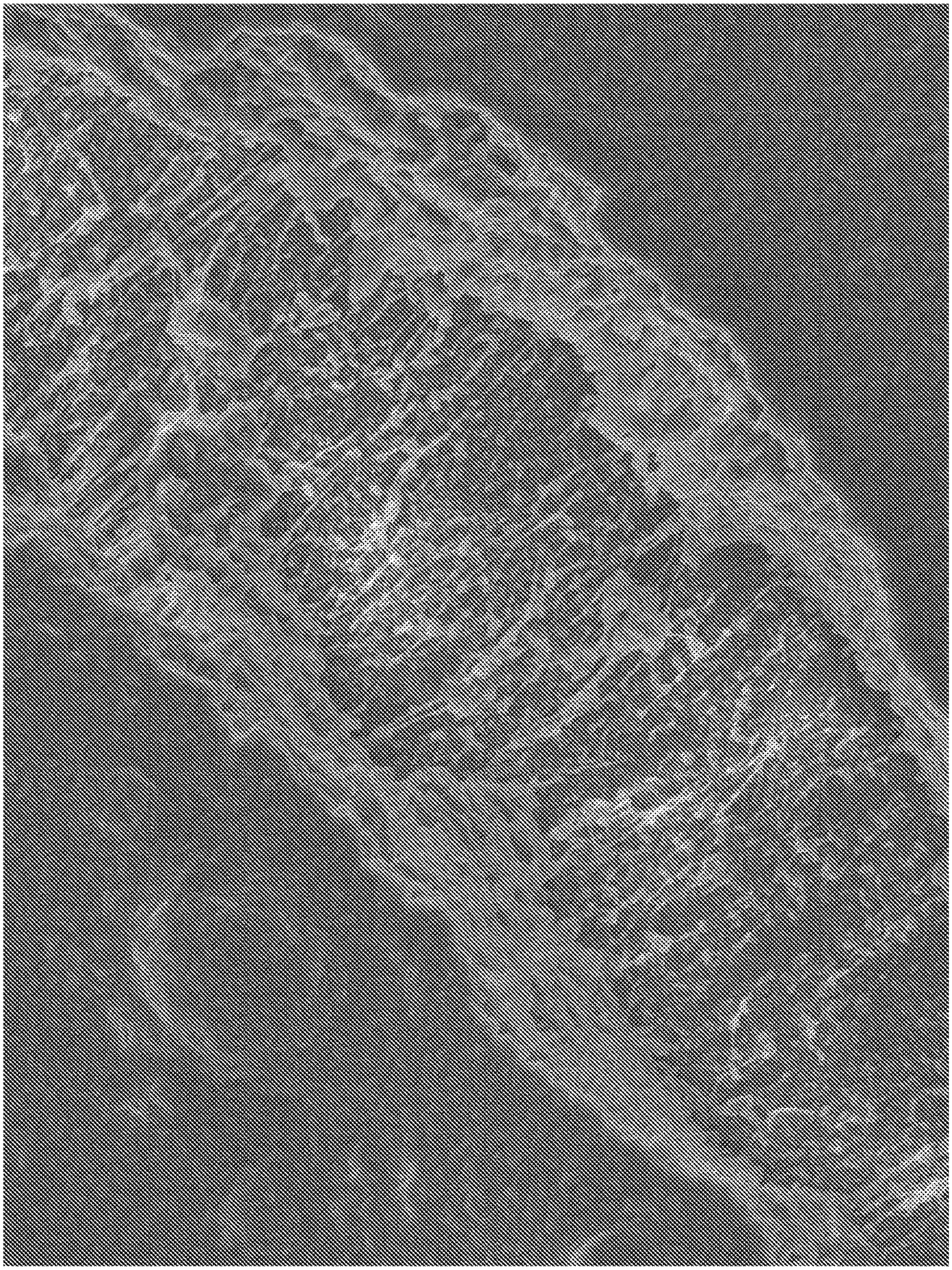
Figure 11C:
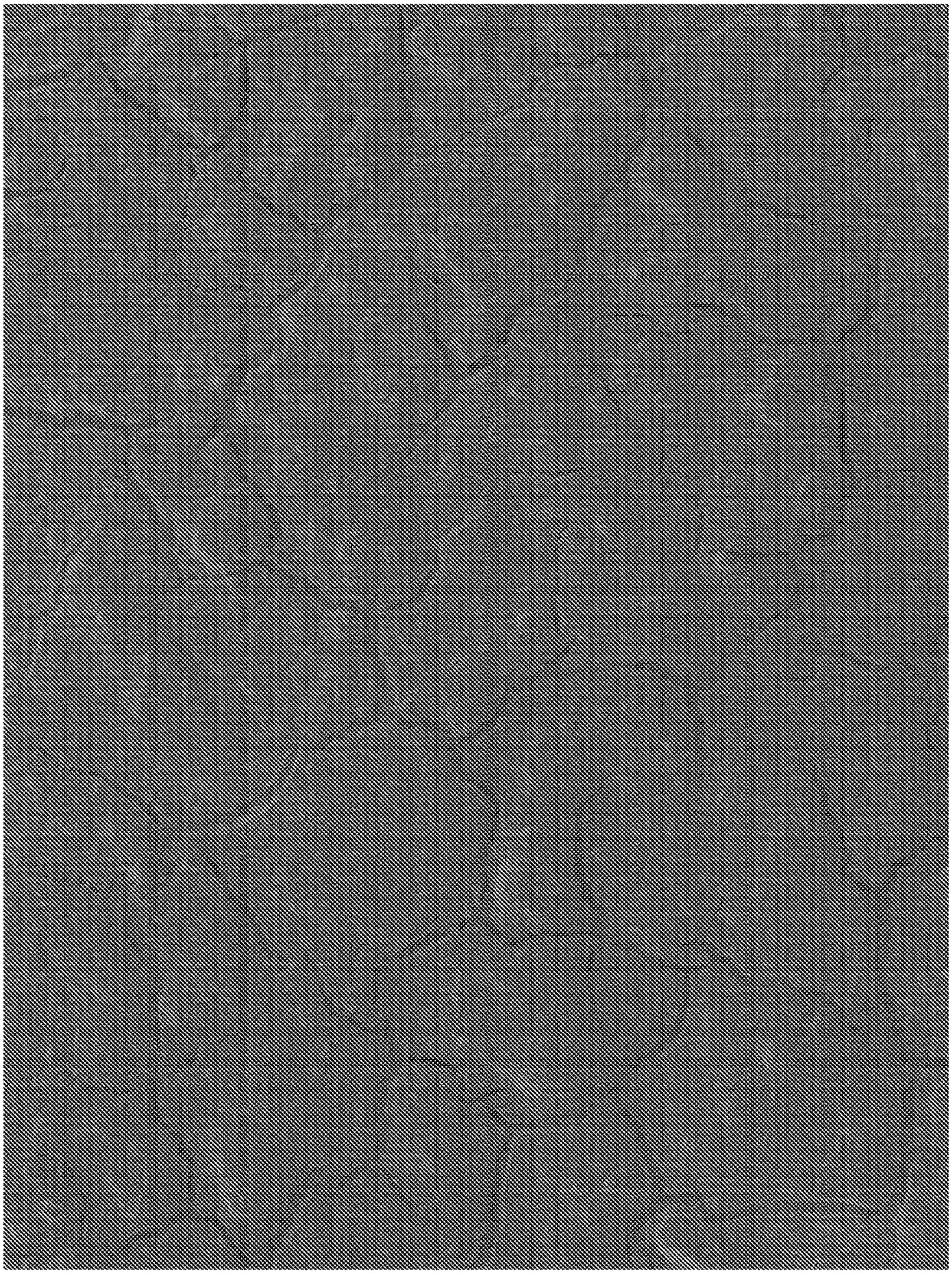
Figure 11D:
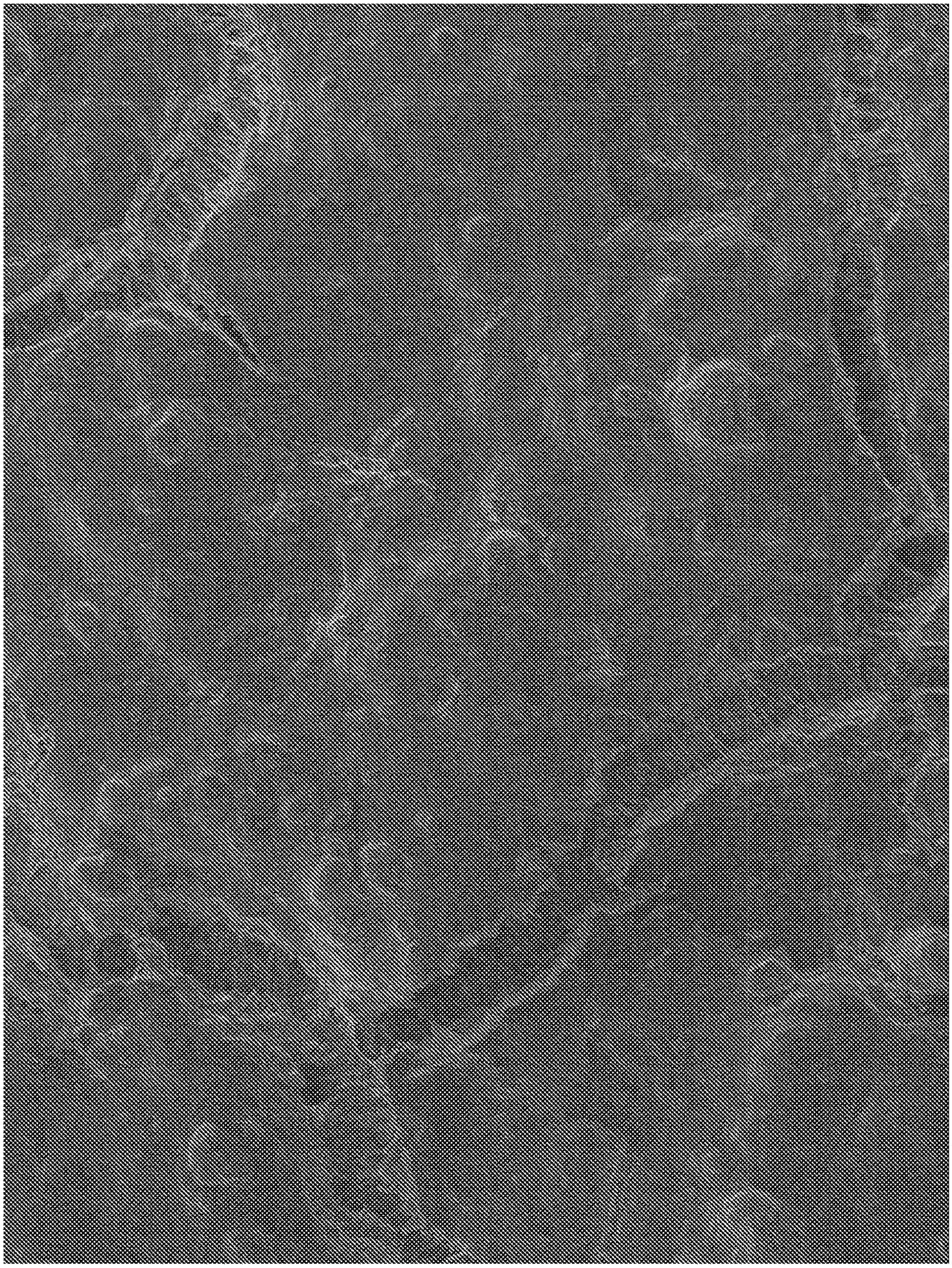

Furthermore, to minimise solvent use and aid commercial and industrial viability, the relationship between concentration and number of iterations was studied. A doubly concentrated nanosuspension was used (0.2 g PE/70 ml xylene) to investigate this (see FIG. 8). FIG. 8 shows a graph displaying the relationship between WCA and number of iterations for $SiO_2$/PE nanocomposites with a 1.5 nm, 2 nm and 3 nm thick PE coating (0.2 g PE/70 ml). These results were investigated using SEM. A doubly concentrated nanocomposite suspension led to a thick substrate coating which triggered the formation of cracks on the films surface during the drying process. The lowest WCA obtained from $SiO_2$/PE (1.5 nm PE) films was after 4 iterations; an excess of polymer from the 3rd and 4th iterations promoted cracking, which in turn induced surface wetting by exposure of the underlying substrate material (hydrophilic glass). However, when applying the 5th and 6th iterations, surface cracks were filled with polymer and an increased WCA was observed—see FIG. 9 which shows SEM images of $SiO_2$/PE with a 1.5 nm PE coating, fabricated by (a) 4 iterations and (b) 6 iterations (0.2 g PE/70 ml). Therefore, altering the concentration of the suspension under these conditions to reduce solvent use led to some issues with film formation.

Further Examples 5-7 were prepared as described above. It was observed for both $SiO_2$/PP (Example 6) and $TiO_2$/PE (Example 5) that WCAs decreased with increasing polymer content; as noted for $SiO_2$/PE. Polypropylene had to be heated to 130° C., then decreased to between 68-70° C. to enable full coating of the glass substrate.

The Example polymer coated nanoparticles 5 ($TiO_2$/PE) and 6 ($SiO_2$/PP) were prepared as described above with polymer coatings having an average thickness of 1, 2 and 3 nm. The water contact angles of these polymer coated nanoparticles are shown below in Table 1.

TABLE 1

| Example | Polymer coating thickness (nm) | Average contact angle (°) | Standard deviation |
|---|---|---|---|
| 5 | 1 | 154.1467 | 0.733303 |
| 5 | 2 | 154.0856 | 1.045999 |
| 5 | 3 | 145.0133 | 1.528082 |
| 6 | 1 | 155.8344 | 1.149475 |
| 6 | 2 | 154.1333 | 1.11469 |
| 6 | 3 | 152.7878 | 1.055027 |

These examples demonstrate that functional superhydrophobic films can be fabricated using varied nanoparticle-polymer-solvent systems provided all three components are compatible.

Examples 8 and 9—PVC Coatings

Example 8—$SiO_2$/PVC Film—by Spray Coating

PVC (0.1 g) was added to a solvent (30 ml) in a round bottomed flask and stirred until fully dissolved. Silica nanoparticles (0.2353 g) were added to the flask and stirred for a further 20 minutes, followed by a final 2 minutes of sonication to ensure complete mixing. A hot plate on which the substrate was arranged was set to the desired temperature and the silica/PVC mixture spray coated onto the heated substrate until the substrate was fully coated. The hot plate temperature for different solvent systems was as follows: MIBK: 80° C., MIBK/toluene: 80° C., THF: 50° C.

Methylisobutylketone (MIBK) is a well-known solvent used industrially to dissolve PVC for many applications. Hence, Example 8 was fabricated using PVC dissolved in MIBK and deposited using a spray coating technique as no special conditions were required (heat, inert atmosphere etc). Spray coating of a colloidal suspension of HMDS-functionalised $SiO_2$ coated with approximately 1.5 nm PVC and suspended in MIBK (0.1 g/70 ml) onto a glass substrate which had been pre-coated with a thin layer of PVC, to a form the film of Example 8.

Rapid evaporation of MIBK was found to be necessary in order to successfully fabricate a superhydrophobic film from this composition. It was suspected that spraying onto a cold substrate caused MIBK to dissolve the underlying PVC layer which then mixed with the PVC coating on the $SiO_2$ nanoparticles, preventing the resultant film from being superhydrophobic. Therefore, spraying onto a hot substrate (e.g. at 50° C.) was found to be beneficial.

Spray coating $SiO_2$/PVC in MIBK onto a heated PVC material substrate (50° C.) required many iterations (~15) in order to show some degree of superhydrophobicity. However, using an excess of MIBK weakened the substrate significantly as evaporation at 50° C. was still relatively slow due to MIBK having a boiling point of 116° C. and low vapour pressure.

Attempts were made to overcome this by (i) using a mixed solvent system of MIBK and toluene; (ii) using doubly concentrated suspensions; and (iii) using a higher deposition temperature. Toluene solubilises PVC at a considerably slower rate than MIBK, so it was therefore anticipated that the underlying substrate would not be completely dissolved—a mixed solvent system (1:2 vol toluene:MIBK) was therefore used. Doubly concentrated suspensions of $SiO_2$/PVC in MIBK (0.1 g/30 ml MIBK) and $SiO_2$-PVC MIBK/toluene (0.1 g/10 ml MIBK/20 ml toluene) were prepared in order to limit solvent use and were used to coat PVC material at 80° C. A higher deposition temperature was used to encourage rapid removal of solvent, hence, keeping substrate solvation to a minimum.

The resultant films were mostly superhydrophobic and the coatings appeared to be physically attached to the underlying substrate under both solvent conditions (see FIG. 10). FIG. 10 shows side-on SEM images of the PVC substrate and $SiO_2$/PVC film which has been applied to the substrate: (a) and (b) are of the PVC material substrate before coating; (c) and (d) are of $SiO_2$/PVC coating fabricated using a doubly concentrated MIBK solution; and (e) and (f) are of a $SiO_2$/PVC coating fabricated using a doubly concentrated toluene/MIBK solution.

Solvent evaporation at elevated temperatures introduced some cracking of the films, in parts, which led to increased water adherence which made coatings unreproducible, as seen in FIG. 11. FIG. 11 shows SEM images of: (a) and (b) $SiO_2$/PVC coating fabricated using a doubly concentrated MIBK; and (c) and (d) $SiO_2$/PVC coating fabricated using a doubly concentrated toluene/MIBK solution. Additionally, coatings fabricated via MIBK/toluene solvent systems displayed reduced robustness when faced with a simple finger wipe test in comparison to films made with only MIBK. This was most likely due to reduced physical binding between coating and substrate.

To provide consistent superhydrophobic films, i.e. films without cracks, MIBK solvent was replaced with tetrahydrofuran (THF); a solvent which readily dissolves PVC and has a lower boiling point and increased vapour pressure compared to MIBK. $SiO_2$/PVC in THF (0.1 g/30 ml THF) solutions were deposited at a lower temperature of 40-50° C. which provided films with high superhydrophobicity and significantly reduced cracking. A plasticized PVC coated polyester fabric material (comprising 40-50 wt % of a phthalate ester plasticizer) was also dissolved in THF and used to coat the $SiO_2$ nanoparticles. This suspension was then sprayed onto a moderately heated (40-50° C.) substrate of the same material to clearly demonstrate the fabrication method allows the same PVC material to be used as the substrate and the hydrophobic coating surrounding particles, which could improve the physical resilience of coatings.

Example 9—$SiO_2$/PVC/Plasticizer Film—by Hot Pressing

Figure 12:
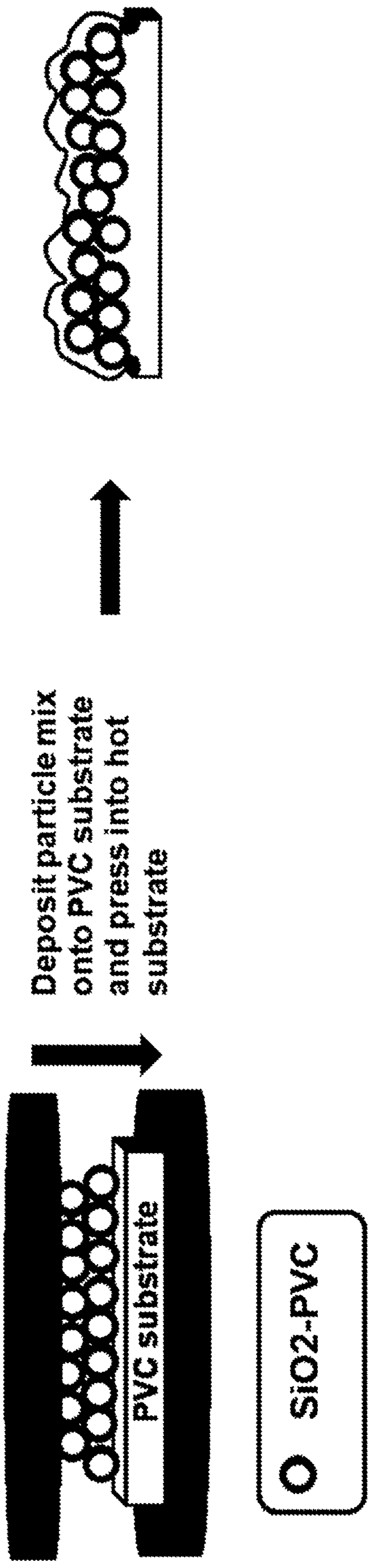

To aid commercial and industrial viability, a solvent-less fabrication method was employed to generate robust superhydrophobic films. The process involved synthesising silica-PVC nanocomposite particles (as described below), grinding them into finer particles aggregates and hot pressing the particles into the plasticized PVC material (as described above) at 180° C., as shown in FIG. 12. The plasticized PVC material, used here also as the substrate, was dissolved in tetrahydrofuran (THF) and used to coat silica particles to encourage strong physical bonding between the coating and substrate. This was aimed at increased mechanical robustness. THF was used initially to synthesise silica-PVC nanocomposites, however, more environmentally friendly solvents that are compatible with both components, for example methylisobutylketone (MIBK) and butyl acetate, may work in a similar manner. Solvents can be collected via evaporation/condensation during particle synthesis and recycled.

Plasticized PVC (40 wt % DIDP in PVC) was prepared by mixing 0.6 g PVC and 0.41 mL DIDP (diisodecyl phthalate) thoroughly in a crucible (total mass 1 g—individual mass of each component depends on wt %). A hot plate was heated to 180° C. and the crucible placed on the hot plate until the PVC fully dissolved into the plasticizer to form a viscous, clear liquid. The mixture was then left to cool to room temperature to provide plasticized PVC.

PVC coated $SiO_2$ nanoparticles were then prepared as follows. Plasticized PVC (0.1 g) was dissolved in THF (30 ml) and pre-functionalised silica nanoparticles (0.2365 g) were added into the PVC/THF solution and stirred for 30 minutes, followed by 2 minutes sonication. This solution was evaporated by heating to collect silica-PVC powder. This powder was ground with a pestle and mortar to break down any large aggregates.

A hot press film formation method onto a PVC substrate was used with the $SiO_2$/PVC/plasticizer powder composition prepared as above. The PVC substrate was fully covered with $SiO_2$/PVC/plasticizer powder and placed between two pieces of foil. This sample of substrate, powder and foil layers was hot pressed using a suitable hot pressing apparatus at 180° C. for 30 seconds. Any excess powder was removed and a new layer $SiO_2$/PVC/plasticizer powder was laid on to the substrate. The sample was then hot pressed as above and the process repeated with a further layer of $SiO_2$/PVC/plasticizer powder. The sample was then immediately placed into fridge for 30 minutes to cool.

Figure 13A:
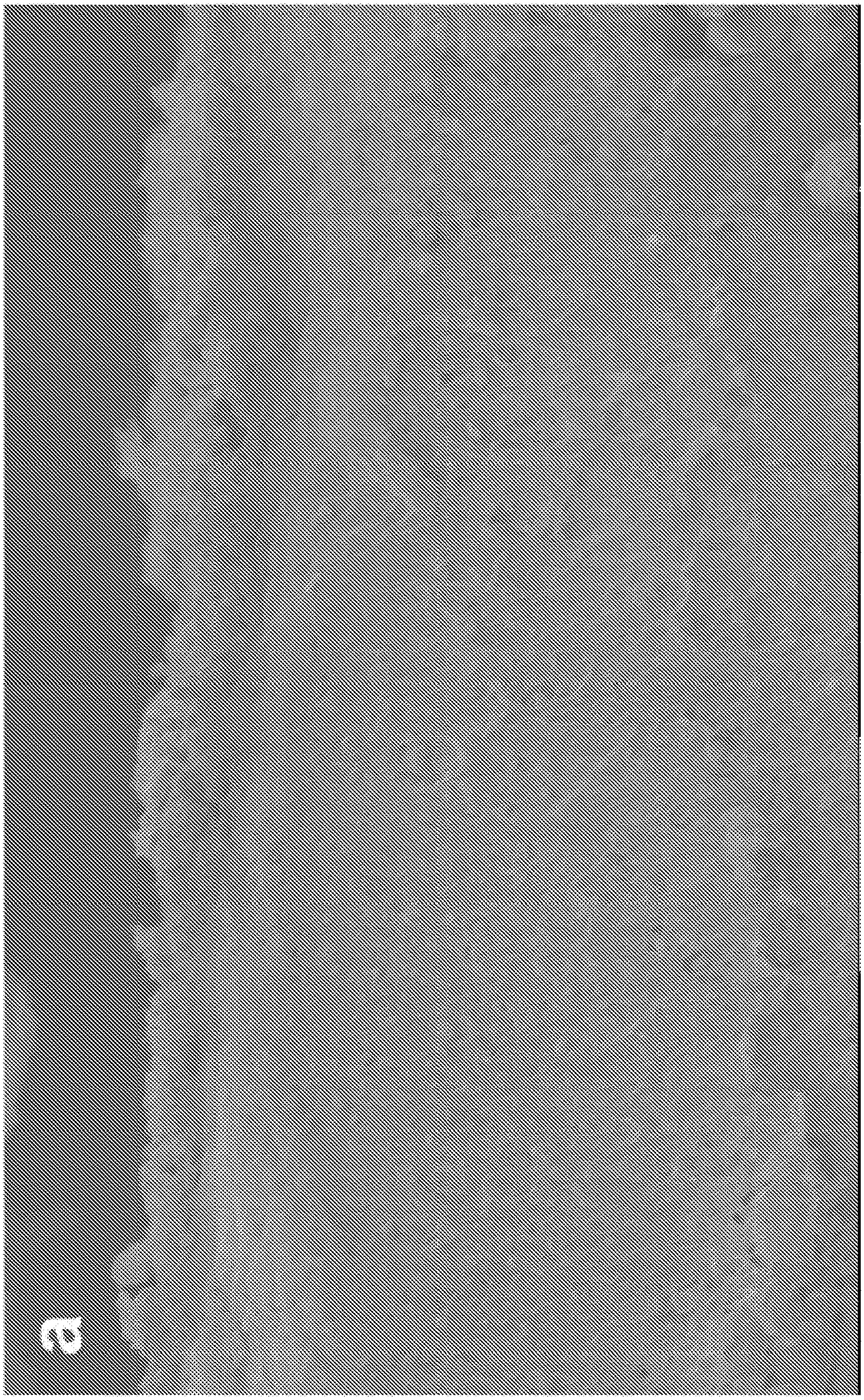
Figure 13B:
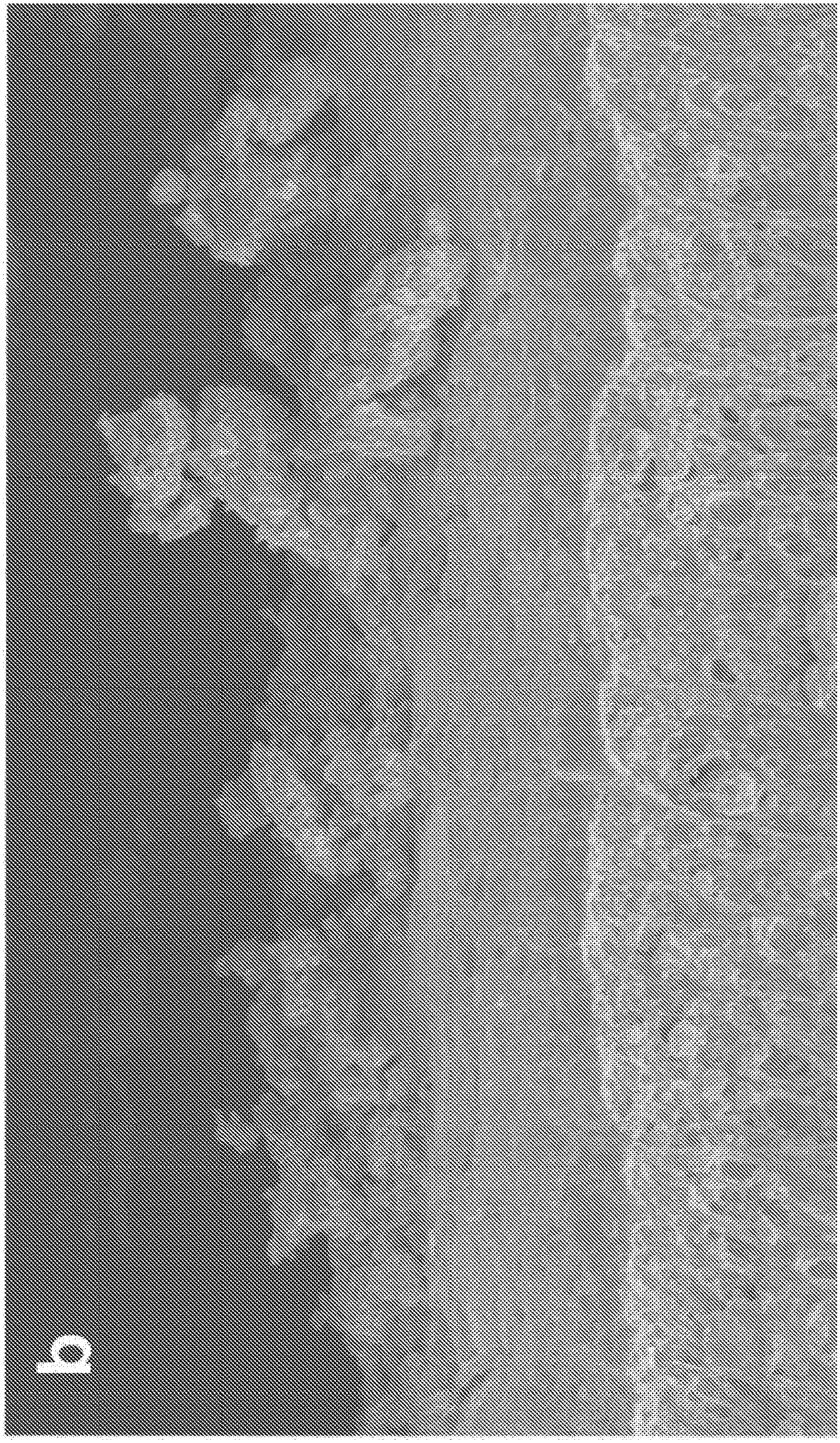

Scanning electron microscopy (SEM) was used to image cross sections of applied coatings. FIG. 13 shows side on SEM images of hot pressed silica-PVC films into a plasticized PVC material substrate. It can be seen in FIG. 13 that independent layers are not apparent and the substrate and coating film appear to be physically fused together.

Figure 14:
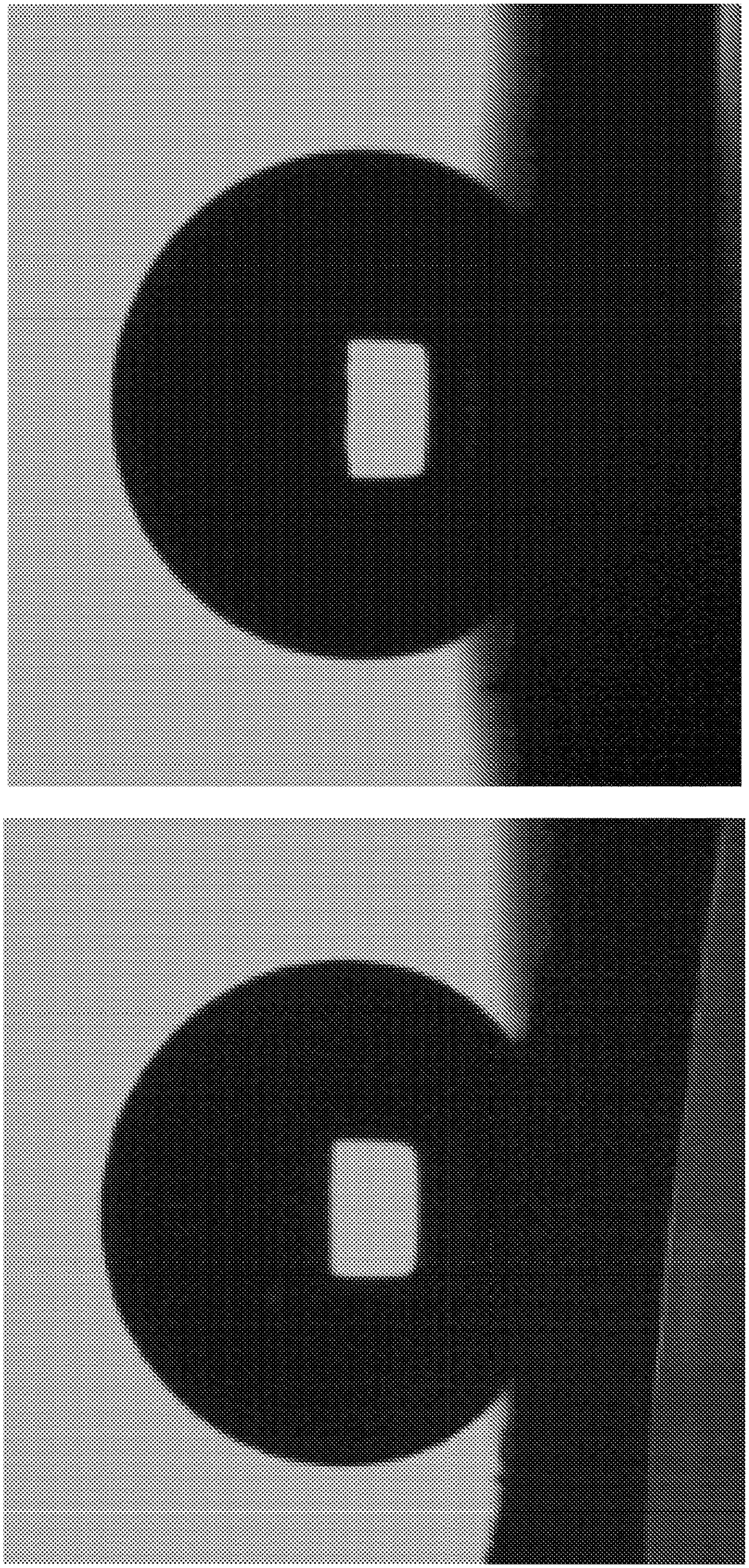
Figure 15:
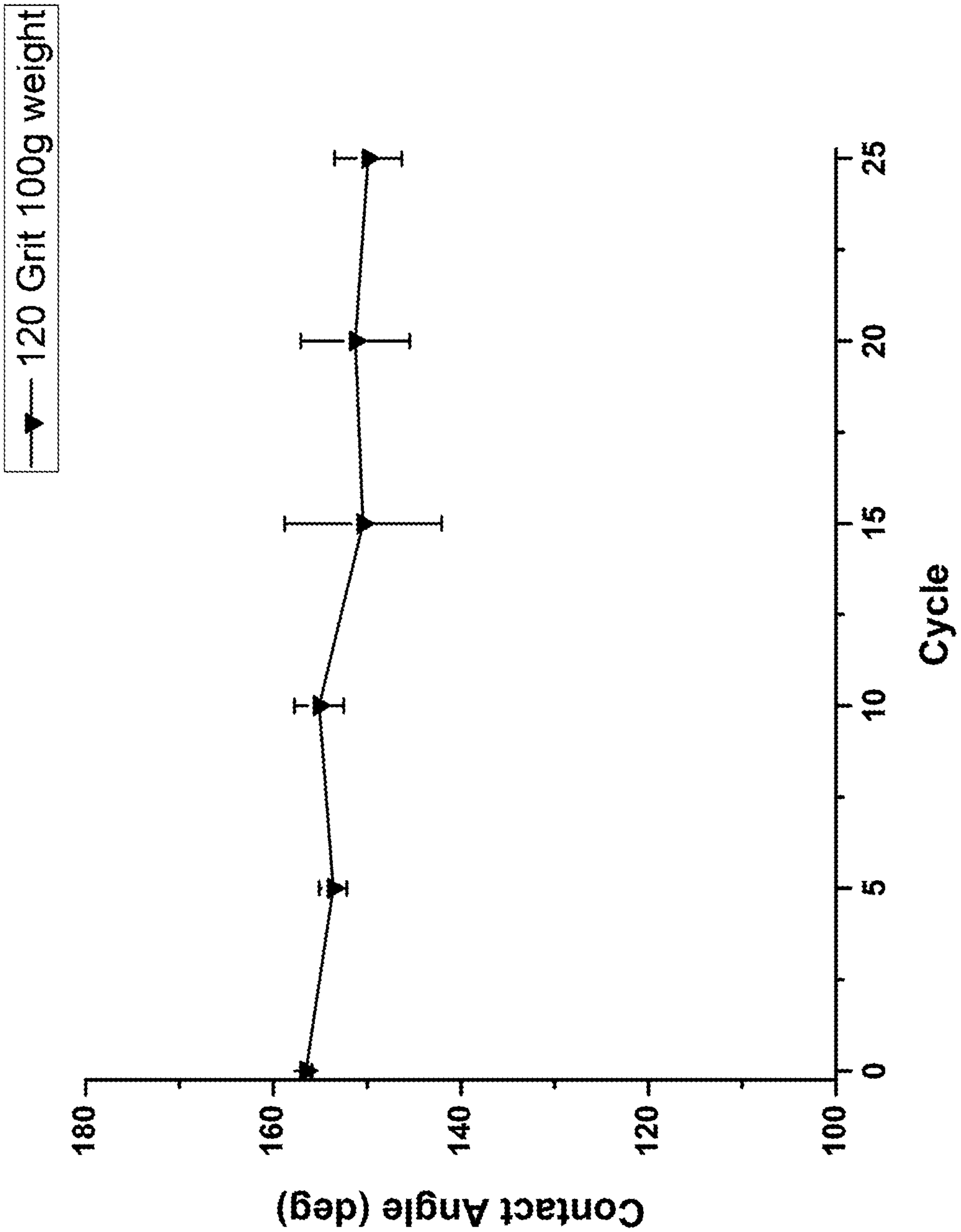

The samples of this hot pressed film were subjected to an arbitrary robustness test to assess mechanical durability. The weighted sample (100 g), attached to a glass support, was placed coating down and pushed 10 cm across sandpaper, turned by 90° and pushed a further 10 cm to complete one cycle (standard sand paper, grit no. P120). Before physical abrasion, a WCA of 156.5±1° was recorded, demonstrating the superhydrophobicity of these films. Initially, surface adhesion of a water droplet to the surface was not observed, as trapped air that resides in between surface protrusions allows only minimal contact between the hydrophobic surface and the droplet. A total of 25 cycles were carried out; a decrease in WCA was observed after the 25th cycle (149.9±4°). However, water droplets could be seen to readily bead up when making contact with the film, even in the most visually damaged parts where the film coating looked to be removed completely. This is most likely due to the action of the underlying PVC-$SiO_2$/PVC layers hot pressed into the PVC substrate. FIG. 14 shows images taken on a Drop Shape Analyser of the hot pressed silica/PVC sample (Example 9) before (left) and after 25 cycles of physical abrasion (right). FIG. 15 shows the change in WCA for Example 9 (40 wt % DIDP in PVC/$SiO_2$) over the 25 cycles of abrasion.

In summary, the present invention provides a superhydrophobic film for coating a substrate. The superhydrophobic film comprises a plurality of nanoparticles joined together to form a continuous film, each nanoparticle having a polymer coating, wherein the ratio of average particle size of the nanoparticles to the average thickness of their polymer coatings is from 2.5:1 to 20:1. The superhydrophobic film suitably provides a durable, UV resistant coating which maintains a high water contact angle during use. A method of preparing a superhydrophobic film on a substrate is also provided, the method comprising admixing nanoparticles and a polymer to form nanoparticles having a polymer coating and applying the nanoparticles having a polymer coating to the substrate to form the superhydrophobic film. A formulation for coating an article with such a superhydrophobic film is also provided.

Although a few preferred embodiments have been shown and described, it will be appreciated by those skilled in the art that various changes and modifications might be made without departing from the scope of the invention, as defined in the appended claims.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, when referring to compositions, a composition consisting essentially of a set of components will comprise less than 5% by weight, typically less than 3% by weight, more typically less than 1% by weight of non-specified components.

The term "consisting of" or "consists of" means including the components specified but excluding addition of other components.

Whenever appropriate, depending upon the context, the use of the term "comprises" or "comprising" may also be taken to encompass or include the meaning "consists essentially of" or "consisting essentially of", and may also be taken to include the meaning "consists of" or "consisting of".

For the avoidance of doubt, wherein amounts of components in a composition are described in wt %, this means the weight percentage of the specified component in relation to the whole composition referred to.

The optional features set out herein may be used either individually or in combination with each other where appropriate and particularly in the combinations as set out in the accompanying claims. The optional features for each aspect or exemplary embodiment of the invention as set out herein are also to be read as applicable to any other aspect or exemplary embodiments of the invention, where appropriate. In other words, the skilled person reading this specification should consider the optional features for each exemplary embodiment of the invention as interchangeable and combinable between different exemplary embodiments.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, and drawings), or to any novel one, or any novel combination, of the steps of any method or process so disclosed.

The invention claimed is:

1. A superhydrophobic film comprising an agglomeration of polymer-coated nanoparticles, wherein the polymer-coated nanoparticles comprise nanoparticles and polymer coatings on the nanoparticles, wherein the ratio of the volume of the polymer coating to the volume of the nanoparticles is from 1:1 to 1:3 and the polymer-coated nanoparticles have a ratio of average particle size of nanoparticles to average thickness of their polymer coatings of from 2.5:1 to 20:1, wherein the polymer of the polymer coatings is selected from a group consisting of: polyethylene, polypropylene, and a mixture thereof, and wherein the polymer-coated nanoparticles are obtained by a method that comprises mixing the nanoparticles and the polymer in a solvent, the solvent comprising xylene or toluene.

2. The superhydrophobic film according to claim 1, wherein the nanoparticles are metal oxide nanoparticles.

3. The superhydrophobic film according to claim 2, wherein metal oxide the nanoparticles are selected from $SiO_2$, $TiO_2$, $CeO_2$ or mixtures thereof.

4. The superhydrophobic film according to claim 1, wherein the nanoparticles have an average particle size of from 5 to 500 nm.

5. The superhydrophobic film according to claim 1 having a water contact angle of at least 150°.

6. An article comprising the superhydrophobic film according to claim 1.

7. A method of preparing the superhydrophobic film of claim 1 on a substrate, the method comprising the steps of:

a) admixing the nanoparticles and the polymer in the solvent to form the polymer-coated nanoparticles; and b) applying the polymer-coated nanoparticles to the substrate to form the superhydrophobic film.

8. The method according to claim 7, wherein the nanoparticles and the polymer are mixed in a volume ratio of from 3:1 to 1:5.

9. The method according to claim 7, wherein step b) comprises applying the polymer coated nanoparticles in the solvent to the substrate.

10. The method according to claim 7, wherein step a) is followed by a step a2) of forming a powder of the polymer coated nanoparticles, and wherein step b) comprises hot pressing the powder of the polymer coated nanoparticles onto the substrate.

11. The superhydrophobic film according to claim 1, wherein the polymer comprises polyethylene, and the polymer-coated nanoparticles are obtained by a method that comprises dissolving the polymer in the solvent at a temperature of at least 110° C., and then adding the nanoparticles to form a suspension of the polymer-coated nanoparticles.

12. The superhydrophobic film according to claim 11, wherein the superhydrophobic film is obtained by a method that comprises dip coating a substrate with the suspension at a temperature of 83-88° C.

13. The superhydrophobic film according to claim 1, wherein the polymer comprises polypropylene, and the polymer-coated nanoparticles are obtained by a method that comprises dissolving the polymer in the solvent at a temperature of at least 130° C., and then adding the nanoparticles to form a suspension of the polymer-coated nanoparticles.

14. The superhydrophobic film according to claim 13, wherein the superhydrophobic film is obtained by a method that comprises dip coating a substrate with the suspension at a temperature of 68-70° C.

* * * * *